(12) United States Patent
Stevens et al.

(10) Patent No.: US 9,177,282 B2
(45) Date of Patent: Nov. 3, 2015

(54) CONTEXTUALLY AWARE MONITORING OF ASSETS

(75) Inventors: Timothy Dirk Stevens, Boulder, CO (US); Nicholas James Quinn, San Jose, CA (US); Nicholas D. Cova, Salt Lake City, UT (US)

(73) Assignee: Deal Magic Inc., Houston, TX (US)

( * ) Notice: Subject to any disclaimer, the term of this patent is extended or adjusted under 35 U.S.C. 154(b) by 50 days.

(21) Appl. No.: 12/858,034

(22) Filed: Aug. 17, 2010

(65) Prior Publication Data

US 2011/0133888 A1    Jun. 9, 2011

Related U.S. Application Data

(60) Provisional application No. 61/234,600, filed on Aug. 17, 2009, provisional application No. 61/291,232, filed on Dec. 30, 2009.

(51) Int. Cl.
*G08B 5/22* (2006.01)
*G06Q 10/08* (2012.01)
*G06Q 50/28* (2012.01)

(52) U.S. Cl.
CPC ........... *G06Q 10/0833* (2013.01); *G06Q 50/28* (2013.01)

(58) Field of Classification Search
USPC ............ 340/8.1, 10.1, 539.1, 539.11, 539.13; 342/27, 450, 457, 464, 89
See application file for complete search history.

(56) References Cited

U.S. PATENT DOCUMENTS

| | | | |
|---|---|---|---|
| 690,191 | A | 12/1901 | Saxe |
| 3,242,625 | A | 3/1966 | Tillinghast |
| 3,993,987 | A | 11/1976 | Stevens |
| 4,233,595 | A | 11/1980 | Landkammer |

(Continued)

FOREIGN PATENT DOCUMENTS

| CN | 1676842 A | 10/2005 |
|---|---|---|
| CN | 1989513 A | 6/2007 |

(Continued)

OTHER PUBLICATIONS

International Search Report and Written Opinion of the International Searching Authority, PCT Application Serial No. PCT/US2010/045776, Oct. 8, 2010, 10pp.

(Continued)

*Primary Examiner* — Paul Obiniyi
(74) *Attorney, Agent, or Firm* — Fish & Richardson P.C.

(57) ABSTRACT

An apparatus, method and system for contextually aware monitoring of a supply chain are disclosed. In some implementations, contextually aware monitoring can include monitoring of the supply chain tradelane with tracking devices including sensors for determining location, velocity, heading, vibration, acceleration (e.g., 3D acceleration), or any other sensor that can monitor the environment of the shipping container to provide contextual awareness. The contextual awareness can be enabled by geofencing and recursive algorithms, which allow dynamic modification of the tracking device behavior. Dynamic modification can reduce performance to save power (e.g., save battery usage) and lower costs. Dynamic modification can increase performance where it matters in the supply chain for improved reporting accuracy or frequency or recognition of supply chain events. Dynamic modification can adapt performance such as wireless communications to the region or location of the tracking device.

24 Claims, 22 Drawing Sheets

(56) References Cited

U.S. PATENT DOCUMENTS

| | | | |
|---|---|---|---|
| 4,466,288 A * | 8/1984 | Grynberg et al. | 73/654 |
| 4,507,654 A | 3/1985 | Stolarczyk et al. | |
| 4,729,626 A | 3/1988 | Stieff | |
| 4,736,857 A | 4/1988 | Monico, Jr. et al. | |
| 4,750,197 A | 6/1988 | Denekamp et al. | |
| 5,151,684 A | 9/1992 | Johnsen | |
| 5,189,396 A | 2/1993 | Stobbe | |
| 5,266,925 A | 11/1993 | Vercellotti et al. | |
| 5,483,666 A * | 1/1996 | Yamada et al. | 455/454 |
| 5,491,486 A * | 2/1996 | Welles et al. | 342/357.74 |
| 5,515,030 A | 5/1996 | Citron et al. | |
| 5,565,858 A | 10/1996 | Guthrie | |
| 5,656,996 A | 8/1997 | Houser | |
| 5,664,292 A * | 9/1997 | Chen | 24/3.11 |
| 5,710,973 A * | 1/1998 | Yamada et al. | 455/434 |
| 5,752,218 A * | 5/1998 | Harrison et al. | 701/485 |
| 5,758,263 A * | 5/1998 | Berger et al. | 455/67.14 |
| 5,774,876 A | 6/1998 | Woolley et al. | |
| 5,798,460 A * | 8/1998 | Nakagawa et al. | 73/654 |
| 5,815,407 A | 9/1998 | Huffman et al. | |
| 5,827,965 A * | 10/1998 | Nakagawa et al. | 73/488 |
| 5,861,810 A | 1/1999 | Nguyen | |
| 5,946,350 A * | 8/1999 | Uesugi | 375/233 |
| 5,959,529 A | 9/1999 | Kail, IV | |
| 6,026,690 A * | 2/2000 | Nakagawa et al. | 73/654 |
| 6,069,563 A | 5/2000 | Kadner et al. | |
| 6,075,443 A | 6/2000 | Schepps et al. | |
| 6,147,644 A * | 11/2000 | Castles et al. | 342/367 |
| 6,243,005 B1 | 6/2001 | Haimovich et al. | |
| 6,249,252 B1 * | 6/2001 | Dupray | 342/450 |
| 6,265,973 B1 | 7/2001 | Brammall et al. | |
| 6,292,108 B1 * | 9/2001 | Straser et al. | 340/870.11 |
| 6,304,211 B1 * | 10/2001 | Boman | 342/357.34 |
| 6,420,971 B1 | 7/2002 | Leck et al. | |
| 6,437,702 B1 | 8/2002 | Ragland et al. | |
| 6,469,627 B1 | 10/2002 | Forster | |
| 6,496,766 B1 | 12/2002 | Bernold et al. | |
| 6,529,131 B2 | 3/2003 | Wentworth | |
| 6,571,213 B1 | 5/2003 | Altendahl et al. | |
| 6,727,817 B2 | 4/2004 | Maloney | |
| 6,736,768 B2 | 5/2004 | Felt et al. | |
| 6,747,558 B1 | 6/2004 | Thorne | |
| 6,753,775 B2 | 6/2004 | Auerbach et al. | |
| 6,778,083 B2 | 8/2004 | Auerbach et al. | |
| 6,792,353 B2 | 9/2004 | Lin | |
| 6,879,962 B1 | 4/2005 | Smith et al. | |
| 6,919,803 B2 | 7/2005 | Breed | |
| 6,927,688 B2 | 8/2005 | Tice | |
| 6,965,313 B1 * | 11/2005 | Saylor et al. | 340/539.18 |
| 6,965,604 B1 * | 11/2005 | Sato et al. | 370/401 |
| 6,972,682 B2 | 12/2005 | Lareau et al. | |
| 6,990,335 B1 * | 1/2006 | Shamoon et al. | 455/419 |
| 7,019,683 B2 | 3/2006 | Stevens et al. | |
| 7,035,856 B1 | 4/2006 | Morimoto | |
| 7,044,374 B2 | 5/2006 | Allison et al. | |
| 7,049,963 B2 * | 5/2006 | Waterhouse et al. | 340/572.1 |
| 7,072,668 B2 | 7/2006 | Chou | |
| 7,098,784 B2 | 8/2006 | Easley et al. | |
| 7,106,244 B2 * | 9/2006 | Hsu | 342/27 |
| 7,113,090 B1 * | 9/2006 | Saylor et al. | 340/539.18 |
| 7,129,837 B2 | 10/2006 | Shannon | |
| 7,136,830 B1 | 11/2006 | Kuelbs et al. | |
| 7,136,832 B2 | 11/2006 | Li et al. | |
| 7,164,986 B2 * | 1/2007 | Humphries et al. | 701/517 |
| 7,193,557 B1 * | 3/2007 | Kovacich et al. | 342/89 |
| 7,196,621 B2 * | 3/2007 | Kochis | 340/539.13 |
| 7,196,622 B2 | 3/2007 | Lambright | |
| 7,212,829 B1 | 5/2007 | Lau et al. | |
| 7,239,238 B2 | 7/2007 | Tester et al. | |
| 7,257,397 B2 * | 8/2007 | Shamoon et al. | 455/419 |
| 7,274,332 B1 * | 9/2007 | Dupray | 342/450 |
| 7,275,651 B2 | 10/2007 | Morales et al. | |
| 7,286,683 B2 * | 10/2007 | Hadell | 382/100 |
| 7,298,327 B2 * | 11/2007 | Dupray et al. | 342/451 |
| 7,299,007 B2 * | 11/2007 | Eskin | 455/41.2 |
| 7,312,752 B2 * | 12/2007 | Smith et al. | 342/464 |
| 7,315,281 B2 | 1/2008 | Dejanovic et al. | |
| 7,336,152 B2 | 2/2008 | Horwitz et al. | |
| 7,336,170 B2 | 2/2008 | Auerbach et al. | |
| 7,339,469 B2 | 3/2008 | Braun | |
| 7,339,473 B2 | 3/2008 | Lucas | |
| 7,350,383 B1 | 4/2008 | Kuo | |
| 7,382,251 B2 | 6/2008 | Bohman et al. | |
| 7,385,500 B2 | 6/2008 | Irwin | |
| 7,385,529 B2 | 6/2008 | Hersh et al. | |
| 7,391,321 B2 * | 6/2008 | Twitchell, Jr. | 340/539.13 |
| 7,394,361 B1 * | 7/2008 | Twitchell, Jr. | 340/539.1 |
| 7,423,535 B2 | 9/2008 | Chung et al. | |
| 7,467,032 B2 | 12/2008 | Kane et al. | |
| 7,471,203 B2 | 12/2008 | Worthy et al. | |
| 7,479,877 B2 | 1/2009 | Mortenson | |
| 7,482,920 B2 * | 1/2009 | Joao | 340/539.11 |
| RE40,642 E * | 2/2009 | Harrison et al. | 701/485 |
| 7,498,938 B2 | 3/2009 | Ulrich | |
| 7,499,997 B2 * | 3/2009 | Hancock et al. | 709/224 |
| 7,525,484 B2 * | 4/2009 | Dupray et al. | 342/450 |
| 7,536,321 B2 * | 5/2009 | Takahashi et al. | 705/330 |
| 7,538,672 B2 | 5/2009 | Lockyer | |
| 7,612,669 B2 | 11/2009 | Brigham | |
| 7,616,116 B2 | 11/2009 | Ehrensvard et al. | |
| 7,623,033 B2 | 11/2009 | Ainsworth et al. | |
| 7,633,389 B2 * | 12/2009 | Mantovani et al. | 340/539.3 |
| 7,639,131 B2 * | 12/2009 | Mock et al. | 340/539.3 |
| 7,643,823 B2 * | 1/2010 | Shamoon et al. | 455/419 |
| 7,652,576 B1 * | 1/2010 | Crossno et al. | 340/572.1 |
| 7,657,468 B1 * | 2/2010 | Whiteley et al. | 705/28 |
| 7,668,532 B2 * | 2/2010 | Shamoon et al. | 455/410 |
| 7,688,207 B2 * | 3/2010 | Fritchie et al. | 340/572.1 |
| 7,707,076 B1 | 4/2010 | Whiteley et al. | |
| 7,714,778 B2 * | 5/2010 | Dupray | 342/357.31 |
| 7,724,138 B2 | 5/2010 | Horwitz et al. | |
| 7,746,228 B2 | 6/2010 | Sensenig et al. | |
| 7,760,103 B2 * | 7/2010 | Frank | 340/600 |
| 7,764,231 B1 * | 7/2010 | Karr et al. | 342/357 |
| 7,822,580 B2 * | 10/2010 | Mustonen | 702/199 |
| 7,825,803 B2 * | 11/2010 | Neff et al. | 340/572.1 |
| 7,830,852 B2 * | 11/2010 | Twitchell, Jr. | 370/338 |
| 7,853,480 B2 | 12/2010 | Taylor et al. | |
| 7,864,061 B2 * | 1/2011 | Frank | 340/600 |
| 7,903,029 B2 * | 3/2011 | Dupray | 342/457 |
| 7,936,266 B2 | 5/2011 | Francis et al. | |
| 7,937,244 B2 | 5/2011 | Kadaba | |
| 7,967,467 B2 | 6/2011 | Devaney et al. | |
| 7,973,536 B2 | 7/2011 | Kojovic et al. | |
| 7,986,238 B2 * | 7/2011 | Cho | 340/572.1 |
| 7,990,270 B2 * | 8/2011 | Mostov | 340/572.1 |
| 7,990,947 B2 * | 8/2011 | Twitchell et al. | 370/351 |
| 8,032,153 B2 * | 10/2011 | Dupray et al. | 455/456.1 |
| 8,064,935 B2 * | 11/2011 | Shamoon et al. | 455/466 |
| 8,068,023 B2 | 11/2011 | Dulin et al. | |
| 8,068,027 B2 | 11/2011 | Auerbach et al. | |
| 8,082,094 B2 | 12/2011 | Gao | |
| 8,082,096 B2 * | 12/2011 | Dupray | 701/465 |
| 8,135,413 B2 * | 3/2012 | Dupray | 455/456.1 |
| 8,164,458 B2 | 4/2012 | Mostov | |
| 8,217,785 B2 * | 7/2012 | Steer | 340/539.13 |
| 8,228,192 B2 | 7/2012 | Eckert et al. | |
| 8,593,280 B2 | 11/2013 | Tan | |
| 2001/0022558 A1 * | 9/2001 | Karr, Jr. et al. | 342/450 |
| 2002/0030625 A1 * | 3/2002 | Cavallaro et al. | 342/357.06 |
| 2002/0075291 A1 * | 6/2002 | Van Gestel et al. | 345/700 |
| 2002/0100300 A1 | 8/2002 | Reeb et al. | |
| 2002/0104013 A1 | 8/2002 | Ghazarian | |
| 2002/0111819 A1 | 8/2002 | Li et al. | |
| 2002/0113704 A1 | 8/2002 | Hess | |
| 2002/0177476 A1 | 11/2002 | Chou | |
| 2003/0055689 A1 | 3/2003 | Block | |
| 2003/0106917 A1 | 6/2003 | Shetler | |
| 2003/0126024 A1 | 7/2003 | Crampton et al. | |
| 2003/0137968 A1 | 7/2003 | Lareau et al. | |
| 2003/0146871 A1 * | 8/2003 | Karr et al. | 342/457 |
| 2003/0171948 A1 | 9/2003 | Thomas et al. | |
| 2003/0195791 A1 | 10/2003 | Waller et al. | |
| 2003/0200100 A1 * | 10/2003 | Wen et al. | 705/1 |

(56) References Cited

U.S. PATENT DOCUMENTS

| | | | |
|---|---|---|---|
| 2003/0222820 A1* | 12/2003 | Karr et al. | 342/457 |
| 2003/0227392 A1 | 12/2003 | Ebert et al. | |
| 2003/0233189 A1 | 12/2003 | Hsiao et al. | |
| 2004/0024644 A1 | 2/2004 | Gui | |
| 2004/0055345 A1 | 3/2004 | Moore | |
| 2004/0088107 A1 | 5/2004 | Seligmann | |
| 2004/0100379 A1 | 5/2004 | Boman et al. | |
| 2004/0113783 A1 | 6/2004 | Yagesh | |
| 2004/0113933 A1* | 6/2004 | Guler | 345/716 |
| 2004/0124977 A1 | 7/2004 | Biffar | |
| 2004/0126015 A1* | 7/2004 | Hadell | 382/181 |
| 2004/0181334 A1* | 9/2004 | Blumbergs et al. | 701/200 |
| 2004/0183673 A1* | 9/2004 | Nageli | 340/539.13 |
| 2004/0193466 A1 | 9/2004 | Kull et al. | |
| 2004/0198386 A1* | 10/2004 | Dupray | 455/456.1 |
| 2004/0199411 A1 | 10/2004 | Bertram et al. | |
| 2004/0202154 A1 | 10/2004 | Aklepi et al. | |
| 2004/0210847 A1* | 10/2004 | Berson et al. | 715/788 |
| 2004/0227630 A1 | 11/2004 | Shannon et al. | |
| 2004/0246130 A1 | 12/2004 | Lambright et al. | |
| 2004/0249722 A1 | 12/2004 | Sugamura | |
| 2004/0257225 A1 | 12/2004 | Webb, Sr. et al. | |
| 2004/0266457 A1* | 12/2004 | Dupray | 455/456.5 |
| 2005/0055237 A1 | 3/2005 | Schmidtberg et al. | |
| 2005/0091091 A1 | 4/2005 | Bjerre et al. | |
| 2005/0154527 A1 | 7/2005 | Ulrich | |
| 2005/0156736 A1 | 7/2005 | Rajapakse et al. | |
| 2005/0159883 A1* | 7/2005 | Humphries et al. | 701/207 |
| 2005/0171856 A1 | 8/2005 | Takahashi | |
| 2005/0190097 A1* | 9/2005 | Hsu | 342/22 |
| 2005/0219037 A1 | 10/2005 | Huang | |
| 2005/0231365 A1 | 10/2005 | Tester | |
| 2005/0248454 A1 | 11/2005 | Hanson et al. | |
| 2005/0256731 A1 | 11/2005 | Mougey et al. | |
| 2006/0047379 A1 | 3/2006 | Schullian et al. | |
| 2006/0054705 A1 | 3/2006 | Garton et al. | |
| 2006/0101897 A1* | 5/2006 | Masuya et al. | 73/12.01 |
| 2006/0105760 A1* | 5/2006 | Shamoon et al. | 455/423 |
| 2006/0109109 A1 | 5/2006 | Rajapakse et al. | |
| 2006/0109114 A1 | 5/2006 | Watts et al. | |
| 2006/0116893 A1* | 6/2006 | Carnes et al. | 705/1 |
| 2006/0123766 A1 | 6/2006 | Wassenhoven | |
| 2006/0145837 A1 | 7/2006 | Horton et al. | |
| 2006/0155591 A1 | 7/2006 | Altaf et al. | |
| 2006/0164232 A1* | 7/2006 | Waterhouse et al. | 340/506 |
| 2006/0184290 A1 | 8/2006 | Kane et al. | |
| 2006/0200560 A1 | 9/2006 | Waugh | |
| 2006/0202824 A1 | 9/2006 | Carroll et al. | |
| 2006/0202825 A1* | 9/2006 | Rajapakse et al. | 340/568.2 |
| 2006/0224398 A1 | 10/2006 | Lakshman | |
| 2006/0229895 A1 | 10/2006 | Kodger | |
| 2006/0232398 A1 | 10/2006 | Nedblake et al. | |
| 2006/0237490 A1 | 10/2006 | Twitchell | |
| 2006/0238332 A1* | 10/2006 | Carle et al. | 340/539.1 |
| 2006/0255934 A1 | 11/2006 | Easley et al. | |
| 2006/0276201 A1* | 12/2006 | Dupray | 455/456.1 |
| 2006/0288744 A1 | 12/2006 | Smith | |
| 2007/0001854 A1 | 1/2007 | Chung et al. | |
| 2007/0043538 A1 | 2/2007 | Johnson et al. | |
| 2007/0046459 A1* | 3/2007 | Silverman et al. | 340/539.13 |
| 2007/0056369 A1* | 3/2007 | Griffin et al. | 73/504.14 |
| 2007/0115902 A1* | 5/2007 | Shamoon et al. | 370/338 |
| 2007/0120381 A1 | 5/2007 | Ehrensvard et al. | |
| 2007/0132547 A1 | 6/2007 | Jung | |
| 2007/0145130 A1 | 6/2007 | Danilewitz | |
| 2007/0150379 A1* | 6/2007 | Vernaci et al. | 705/28 |
| 2007/0155379 A1* | 7/2007 | Shamoon et al. | 455/423 |
| 2007/0167179 A1* | 7/2007 | Shamoon et al. | 455/466 |
| 2007/0182556 A1 | 8/2007 | Rado | |
| 2007/0216542 A1 | 9/2007 | Brosius et al. | |
| 2007/0222232 A1 | 9/2007 | Held | |
| 2007/0222674 A1 | 9/2007 | Tan et al. | |
| 2007/0241888 A1* | 10/2007 | Mantovani et al. | 340/539.13 |
| 2007/0247366 A1 | 10/2007 | Smith et al. | |
| 2007/0252696 A1 | 11/2007 | Belisle et al. | |
| 2007/0262861 A1 | 11/2007 | Anderson et al. | |
| 2007/0285232 A1 | 12/2007 | Bohman et al. | |
| 2007/0287473 A1* | 12/2007 | Dupray | 455/456.1 |
| 2008/0002488 A1 | 1/2008 | Hasegawa | |
| 2008/0006696 A1 | 1/2008 | Piersol et al. | |
| 2008/0039019 A1* | 2/2008 | Eskin | 455/41.2 |
| 2008/0039020 A1* | 2/2008 | Eskin | 455/41.2 |
| 2008/0040244 A1 | 2/2008 | Ricciuti et al. | |
| 2008/0040272 A1* | 2/2008 | Eskin | 705/41 |
| 2008/0041124 A1 | 2/2008 | Rudd | |
| 2008/0042809 A1 | 2/2008 | Watts et al. | |
| 2008/0074265 A1 | 3/2008 | Schoen | |
| 2008/0086391 A1 | 4/2008 | Maynard et al. | |
| 2008/0086455 A1* | 4/2008 | Meisels et al. | 707/3 |
| 2008/0094209 A1* | 4/2008 | Braun | 340/539.13 |
| 2008/0094256 A1 | 4/2008 | Koen | |
| 2008/0111693 A1* | 5/2008 | Johnson et al. | 340/572.1 |
| 2008/0113672 A1* | 5/2008 | Karr et al. | 455/456.1 |
| 2008/0133126 A1* | 6/2008 | Dupray | 701/204 |
| 2008/0143516 A1 | 6/2008 | Mock et al. | |
| 2008/0143604 A1* | 6/2008 | Mock et al. | 342/450 |
| 2008/0150698 A1* | 6/2008 | Smith et al. | 340/10.4 |
| 2008/0157974 A1 | 7/2008 | Boss et al. | |
| 2008/0167049 A1* | 7/2008 | Karr et al. | 455/456.2 |
| 2008/0186166 A1* | 8/2008 | Zhou et al. | 340/539.13 |
| 2008/0224875 A1 | 9/2008 | Phillips et al. | |
| 2008/0231459 A1 | 9/2008 | Corder | |
| 2008/0234923 A1 | 9/2008 | Young | |
| 2008/0248813 A1* | 10/2008 | Chatterjee | 455/456.2 |
| 2008/0252428 A1 | 10/2008 | Robinson et al. | |
| 2008/0281618 A1 | 11/2008 | Mermet et al. | |
| 2008/0309487 A1 | 12/2008 | Chao | |
| 2009/0015400 A1 | 1/2009 | Breed | |
| 2009/0030715 A1 | 1/2009 | Robb et al. | |
| 2009/0060349 A1 | 3/2009 | Linaker et al. | |
| 2009/0083123 A1 | 3/2009 | Powell et al. | |
| 2009/0102657 A1* | 4/2009 | Evans et al. | 340/572.1 |
| 2009/0102660 A1 | 4/2009 | Evans et al. | |
| 2009/0121877 A1 | 5/2009 | Henderson | |
| 2009/0134999 A1 | 5/2009 | Dobson et al. | |
| 2009/0135000 A1* | 5/2009 | Twitchell, Jr. | 340/539.1 |
| 2009/0135015 A1 | 5/2009 | Dobson et al. | |
| 2009/0140886 A1* | 6/2009 | Bender | 340/988 |
| 2009/0146805 A1* | 6/2009 | Joao | 340/539.13 |
| 2009/0146832 A1 | 6/2009 | Ebert et al. | |
| 2009/0167536 A1* | 7/2009 | Clark et al. | 340/573.4 |
| 2009/0177394 A1 | 7/2009 | Walz et al. | |
| 2009/0201169 A1* | 8/2009 | d'Hont et al. | 340/825.49 |
| 2009/0216775 A1* | 8/2009 | Ratliff et al. | 707/10 |
| 2009/0234493 A1 | 9/2009 | Pandit et al. | |
| 2009/0289786 A1 | 11/2009 | Koch | |
| 2009/0303052 A1 | 12/2009 | Aklepi et al. | |
| 2009/0308000 A1 | 12/2009 | Corcoran | |
| 2009/0316682 A1* | 12/2009 | Twitchell et al. | 370/351 |
| 2009/0322510 A1* | 12/2009 | Berger et al. | 340/539.1 |
| 2009/0326971 A1 | 12/2009 | Piccinini et al. | |
| 2010/0012653 A1* | 1/2010 | Ulrich et al. | 220/1.5 |
| 2010/0039284 A1* | 2/2010 | Hall et al. | 340/825.36 |
| 2010/0045436 A1 | 2/2010 | Rinkes | |
| 2010/0066501 A1* | 3/2010 | Ulrich et al. | 340/10.1 |
| 2010/0066561 A1* | 3/2010 | Ulrich et al. | 340/870.07 |
| 2010/0073229 A1 | 3/2010 | Pattabiraman et al. | 342/357.09 |
| 2010/0076902 A1 | 3/2010 | Kraft | |
| 2010/0090822 A1 | 4/2010 | Benson et al. | |
| 2010/0095864 A1 | 4/2010 | Forbes | |
| 2010/0102964 A1 | 4/2010 | Steer | |
| 2010/0116932 A1 | 5/2010 | Helou, Jr. | |
| 2010/0141393 A1* | 6/2010 | Daniel | 340/10.3 |
| 2010/0141445 A1* | 6/2010 | Venkatasubramaniyam et al. | 340/571 |
| 2010/0145739 A1 | 6/2010 | Erhart et al. | |
| 2010/0234045 A1* | 9/2010 | Karr et al. | 455/456.1 |
| 2010/0237711 A1 | 9/2010 | Parsons | |
| 2010/0238032 A1 | 9/2010 | Greene | |
| 2010/0277280 A1* | 11/2010 | Burkart et al. | 340/10.1 |
| 2010/0312715 A1 | 12/2010 | Esque et al. | |
| 2010/0319261 A1 | 12/2010 | Beck | |
| 2011/0012731 A1 | 1/2011 | Stevens | |
| 2011/0025496 A1* | 2/2011 | Cova et al. | 340/539.13 |

(56) References Cited

U.S. PATENT DOCUMENTS

| | | | |
|---|---|---|---|
| 2011/0046775 A1 | 2/2011 | Bailey et al. | |
| 2011/0050397 A1* | 3/2011 | Cova | 340/10.1 |
| 2011/0050423 A1* | 3/2011 | Cova et al. | 340/572.1 |
| 2011/0050424 A1 | 3/2011 | Cova et al. | |
| 2011/0054979 A1 | 3/2011 | Cova et al. | |
| 2011/0120199 A1 | 5/2011 | Auerbach et al. | |
| 2011/0128143 A1* | 6/2011 | Daniel | 340/539.1 |
| 2011/0133932 A1 | 6/2011 | Tan et al. | |
| 2011/0163914 A1* | 7/2011 | Seymour | 342/357.42 |
| 2011/0258930 A1* | 10/2011 | Francis et al. | 49/14 |
| 2011/0260867 A1 | 10/2011 | McCracken | |
| 2011/0266338 A1 | 11/2011 | Babcock et al. | |
| 2011/0283750 A1 | 11/2011 | Will | |
| 2011/0289320 A1* | 11/2011 | Twitchell et al. | 713/176 |
| 2012/0009872 A1* | 1/2012 | Lane et al. | 455/41.1 |
| 2012/0058775 A1* | 3/2012 | Dupray et al. | 455/456.1 |
| 2012/0068846 A1 | 3/2012 | Dalzell | |
| 2012/0069131 A1* | 3/2012 | Abelow | 348/14.01 |
| 2012/0094638 A1* | 4/2012 | Shamoon et al. | 455/414.1 |
| 2012/0154163 A1* | 6/2012 | Jones | 340/657 |
| 2012/0182180 A1* | 7/2012 | Wolf et al. | 342/357.29 |
| 2012/0190380 A1* | 7/2012 | Dupray et al. | 455/456.1 |
| 2012/0303498 A1 | 11/2012 | Cova et al. | |
| 2012/0310854 A1 | 12/2012 | Cova et al. | |
| 2013/0314233 A1 | 11/2013 | Stevens | |
| 2015/0134557 A1 | 5/2015 | Cova | |

FOREIGN PATENT DOCUMENTS

| | | | | |
|---|---|---|---|---|
| CN | 101251886 A | | 8/2008 | |
| GB | 2 368 174 A | | 4/2002 | |
| GB | 2 448 482 A | | 10/2008 | |
| JP | 2003275022 A | | 9/2003 | |
| JP | 2005092746 A | * | 4/2005 | G06F 13/00 |
| JP | 2005092746 A | * | 4/2005 | G06F 13/00 |
| KR | 2011080908 A | | 7/2011 | |
| KR | 2011099470 A | | 9/2011 | |
| NZ | 541176 A | | 8/2005 | |
| WO | WO 98/01772 | | 1/1998 | |
| WO | WO 98/48396 | | 10/1998 | |
| WO | WO 03/098175 | | 11/2003 | |
| WO | WO 2004/013731 | | 2/2004 | |
| WO | WO2006053566 A1 | | 5/2006 | |
| WO | WO 2006/078285 | | 7/2006 | |
| WO | WO 2007/121508 | | 11/2007 | |
| WO | WO 2010/077688 | | 7/2010 | |
| WO | WO 2011/008871 | | 1/2011 | |
| WO | WO 2011/008884 | | 1/2011 | |
| WO | WO 2011/014708 | | 2/2011 | |
| WO | WO 2011/025821 | | 3/2011 | |
| WO | WO 2011/025829 | | 3/2011 | |
| WO | WO 2011/025987 | | 3/2011 | |

OTHER PUBLICATIONS

Reid Simmons et al., "Learning to Predict Driver Route and Destination Intent", Sep. 17-20, 2006, Proceedings of the 2006 IEEE Intelligent Transportation System Conference, pp. 127-132.
U.S. Appl. No. 13/569,862, filed Aug. 8, 2012, Cova et al.
U.S. Appl. No. 13/569,884, filed Aug. 8, 2012, Cova et al.
International Search Report and Written Opinion of the International Searching Authority, PCT Application Serial No. PCT/US2009/067210, received Feb. 4, 2010, 9 pp.
International Preliminary Report on Patentability, PCT Application Serial No. PCT/US2009/067210, received Jun. 23, 2011, 8 pp.
International Search Report and Written Opinion of the International Searching Authority, PCT Application Serial No. PCT/US2010/041994 filed Jul. 14, 2010, received Sep. 14, 2010, 12 pp.
International Preliminary Report on Patentability, PCT Application Serial No. PCT/US2010/041994 filed Jul. 14, 2010, received Jan. 17, 2012, 11 pp.
International Search Report and Written Opinion of the International Searching Authority, PCT Application Serial No. PCT/US2010/047042 filed Aug. 27, 2010, received Dec. 27, 2010, 11 pp.

International Preliminary Report on Patentability, PCT Application Serial No. PCT/US2010/047042 filed Aug. 27, 2010, received Feb. 28, 2012, 8 pp.
International Search Report and Written Opinion of the International Searching Authority, PCT Application Serial No. PCT/US2010/043795 filed Jul. 29, 2010, received Sep. 17, 2010, 11 pp.
International Preliminary Report on Patentability, PCT Application Serial No. PCT/US2010/043795 filed Jul. 29, 2010, received Jan. 31, 2012, 9 pp.
International Preliminary Report on Patentability, PCT Application Serial No. PCT/US2010/045776 filed Aug. 17, 2010, received Feb. 21, 2012, 9 pp.
International Search Report and Written Opinion of the International Searching Authority, PCT Application Serial No. PCT/US2010/042014 filed Jul. 14, 2010, Received Sep. 14, 2010, 8 pp.
International Preliminary Report on Patentability, PCT Application Serial No. PCT/US2010/042014 filed Jul. 14, 2010, Received Jan. 17, 2012, 7 pp.
International Search Report and Written Opinion of the International Searching Authority, PCT Application Serial No. PCT/US2010/046655, mailed Oct. 20, 2010, 9 pp.
International Preliminary Report on Patentability, PCT Application Serial No. PCT/US2010/046655, mailed Mar. 8, 2012, 8 pp.
International Search Report and Written Opinion of the International Searching Authority, PCT Application Serial No. PCT/US2010/046640 filed Aug. 25, 2010, mailed Oct. 18, 2010, 9 pp.
International Preliminary Report on Patentability, PCT Application Serial No. PCT/US2010/046640 filed Aug. 25, 2010, mailed Mar. 6, 2012, 8 pp.
"Hercules "Zigbee" e-Seal Bolt". Bolt eSeal Electronic Seals—TydenBrooks. Retrieved from the internet: URL<URL: http://www.tydenbrooks.com/Products/Electronic-Seals/Bolt-eSeal.aspx>, Aug. 2, 2012. 2 pages.
Bajikar, Sundeep. "Trusted Platform Module (TPM) based Security on Notebook PCs—White Paper", Jun. 20, 2002, Mobile Platforms Group, Intel Corporation. Retrieved from the internet: URL <http://www.intel.com/design/mobile/platform/downloads/Trusted_Platform_Module_White_Paper.pdf>, Aug. 2, 2012. 20 pages.
Chin, Le-Pong, et al. "The Role of Electronic Container Seal (E-Seal) with RFID Technology in the Container Security Initiatives." Proceedings of the International Conference on MEMS, NANO and Smart Systems 2004. ICMENS. Aug. 25-27, 2004. pp. 116-120.
FAQ, Trusted Computing group—Developers. Retrieved from the Internet: URL<http://www.trustedcomputinggroup.org/faq/TPMFAQ/>, Oct. 19, 2010. 2 pages.
GlobalTrak, "GlobalTrak+ Asset Monitoring Unit," 2 pages.
Liaw, M. and Cova, N., "Data Quality Delivered," A Savi Networks White Paper, copyright 2006, 19 pages.
Maersk Line, "Maersk Line Shipping Containers Worldwide". Retrieved from internet: URL<http://www.maerskline.com/link/?page=brochure&path=/our_services/our_e-commerce_services/maerskline.com/the_shipping_process/tracking>, dated Aug. 19, 2009. 7 pages.
Siror, Joseph, et al. "Impact of RFID Technology on Tracking of Export Goods in Kenya." From Journal of Convergence Information Technology, vol. 5, No. 9. Nov. 2010. pp. 190-200.
Hungarian Intellectual Property Office, Written Opinion, Application No. 201201127-6 mailed Dec. 6, 2012, 7 pages.
Search Report; May 26, 2013; China; 201080031901.7; 4 pages.
Hungarian Intellectual Property Office, Written Opinion, Singapore Application No. 201201127-6 mailed Aug. 1, 2013, 6 pages.
U.S. Appl. No. 60/411,042, filed Sep. 17, 2002, 8 pages.
Bohman, "How can electronic seals assure container integrity that mechanical seals cannot?" Mar. 3, 2003, 19 pages.
Northwest International Trade Corridor Program Phase Three, "Electronic Container Seals Field Operational Test Project, Task #2, Technology Review Report," Sep. 15, 2003, 34 pages.
Science Applications International Corporation, "Container Seal Technologies and Process Phase 1," Jul. 11, 2003, 114 pages.
Williams, "Smart transport—a survey of tracking technologies for cargo containers and their transport platforms," Sep. 2003, 85 pages.
European Search Report in Application No. 09836733.7, dated Sep. 26, 2013, 3 pages.

(56) References Cited

OTHER PUBLICATIONS

European Search Report in Application No. 13172053.4, dated Oct. 9, 2013, 3 pages.

European Search Report; Dec. 3, 2012; European Patent Office (EPO); 10800498.7; 3 pages.

GlobalTrak; GlobalTrak+ Asset Monitoring Unit; GlobalTrak Product Brochure/Datasheet; Pre-Oct. 1, 2009; 2 pages.

European Search Report for App. No. EP 10 81 2680 dated Jul. 24, 2014, 5 pages.

European Search Report for App. No. EP 10 81 2585 dated Sep. 24, 2014, 7 pages.

* cited by examiner

```
ForwardBackward(guessState, sequenceIndex):
    if sequenceIndex is past the end of the sequence, return 1
    if (guessState, sequenceIndex) has been seen before, return saved result
    result = 0
    for each neighboring state n:
        result = result + (transition probability from guessState to n given observation
element at sequenceIndex)*ForwardBackward(n, sequenceIndex+1)
    save result for (guessState, sequenceIndex)
    return result
```

FIG. 7

1) Initialization:

$$\delta_1(i) = \pi_i b_i(o_1), \quad 1 \leq i \leq N$$

$$\psi_1(i) = 0.$$

2) Recursion:

$$\delta_t(j) = \max_{1 \leq i \leq N} [\delta_{t-1}(i) a_{ij}] b_j(o_t), \quad \begin{array}{c} 2 \leq t \leq T \\ 1 \leq j \leq T \end{array}$$

$$\psi_t(j) = \operatorname*{argmax}_{1 \leq i \leq N} [\delta_{t-1}(i) a_{ij}], \quad \begin{array}{c} 2 \leq t \leq T \\ 1 \leq j \leq N. \end{array}$$

3) Termination:

$$P^* = \max_{1 \leq i \leq N} [\delta_T(i)]$$

$$q_t^* = \operatorname*{argmax}_{1 \leq i \leq N} [\delta_T(i)].$$

4) Path (state sequence) backtracking:

$$q_t^* = \psi_{t+1}(q_{t+1}^*), \quad t = T - 1, T - 2, \ldots, 1.$$

FIG. 8

Viterbi( $\lambda$, $O^{tT-1}$, T)   // $\alpha_i(t)$ denotes $P(q_i(t)|O^{tT-1})$
for i=1 to |X|
   $q_i(1) \leftarrow \{x_i\}, \alpha_i(1) \leftarrow \{1$ if $x_i$ is start state $x_1$, else 0$\}$ ← 1100
   for t=1 to T-1          //for each obs $O^t \in O^{tT}$
      for i=1 to |X|          //for each state $x_t^{t+1}$ at time t+1
         $j_{max} \leftarrow 0, P_{max} \leftarrow -1$    ← 1101
         for k=1 to |X|      //compute arg max over $x_k^t$
            if $(\alpha_k(t) \cdot P_i^{t+1}, O^t|x_k^t) > P_{max}$ ) then
               $P_{max} \leftarrow \alpha_k(t) \cdot P(x_i^{t+1}, O^t|x_k^t), j_{max} \leftarrow k$   ← 1102
            Endif
         $\alpha_i(t+1) \leftarrow P_{max}$                                    ← 1103
                                  //postpend the next state
         $q_i(t+1) \leftarrow q_{jmax}(t) \circ x_i$
      Next
     Next
    Next
   Next
Return $q_i(T)$ for $0 < i = |X|$ that maximizes $\alpha_i(T)$   ← 1104
End

FIG. 11

Forward-Backward(obsv, prior)
// obsv is a vector of observational values and
// prior is the initial distribution of the first state ← 1200

/*********************************************************
Local vars:
1. fv is a vector of forward probabilities for steps 0,...,t
2. b is a vector representation of backward probabilities, initially all 1's ← 1201
3. sv is a vector of smoothed estimates for steps 1,...,t
*********************************************************/ fv[0]prior for i=1 to t do
    //FORWARD algorithm filters data
    fv[i] FORWARD( fv[i-1] , obsv[i])  ← 1202
Next for i=t downto 1 do
    // NORM multiplies by a constant that ensures sum is 1.
    sv[i] NORM( fv[i] x b)                                    ← 1203
    //BACKWARD algorithm smoothes data
    b BACKWARD( b, obsv[i] )
Next
Return sv

FIG. 12

Cases for Adjusting Dynamic Behavior

Power, Speed, and Accuracy

Either...

1300 — Increase Frequency of Collecting Location Data to Increase Granularity of Location

1302 — Increase Frequency of Sending Communication Reports to Reduce Latency of the Reports

1304 — Use of Higher Accuracy Modes of Navigation Receiver in Tracking Device to Increase Accuracy of Location Data Or...

1301 — Decrease Frequency of Collecting Location Data to Reduce Power Consumption by Tracking Device

1303 — Decrease Frequency of Sending Communication Reports to Reduce Power Consumption by Tracking Device

1305 — Use of Lower Accuracy Modes of Navigation Receiver in Tracking Device to Reduce Power Consumption by Tracking Device

FIG. 13A

Container Status

1311 — Determining the Occurrence of a Change of Custody of the Asset Being Shipped.

1312 — Determining Dynamic Updated ETA of the Asset at the Destination.

1313 — Determining Occurrence of a Stuck Shipment Exception Condition.

FIG. 13C

CONTEXTUALLY AWARE MONITORING OF ASSETS

RELATED APPLICATIONS

This application claims the benefit of priority from U.S. Provisional Application No. 61/234,600, filed Aug. 17, 2009. This application also claims the benefit of priority from U.S. Provisional Application No. 61/291,232, filed Dec. 30, 2009. Each of these provisional applications is incorporated by reference herein in its entirety.

TECHNICAL FIELD

This subject matter is related generally to providing in-transit visibility of shipments in real-time.

BACKGROUND

A wireless tracking device or "tag" can use various technologies such as Global Positioning System (GPS), Radio Frequency Identification (RFID), and General Packet Radio Service (GPRS), to track and report movements of an asset (e.g., a shipping container) on which the device is mounted. Conventional wireless monitoring devices report locations to a tracking service on a set schedule, regardless of whether the location data is needed by users of the tracking service.

SUMMARY

An apparatus, method and system for contextually aware monitoring of an asset's journey through a supply chain are disclosed. In some implementations, contextually aware monitoring can include monitoring of the supply chain tradelane with tracking devices including one or more sensors for determining location, velocity, heading, vibration, acceleration (e.g., 3D acceleration), or any other sensor that can monitor the environment of the shipping container and provide contextual awareness. The contextual awareness can be enabled by geofencing and recursive algorithms, which allow dynamic modification of the tracking device behavior. Dynamic modification can reduce performance to save power (e.g., save battery usage) and lower costs. Dynamic modification can increase performance where it matters in the supply chain for improved reporting accuracy or frequency or recognition of supply chain events. Dynamic modification can adapt performance such as wireless communications to the region or location of the tracking device. Intelligent connection to wireless carriers can be performed, where the device can determine when it should report particular events, based in part on the type of the event and the cost and resources required for reporting.

BRIEF DESCRIPTION OF THE DRAWINGS

FIG. 7 illustrates example pseudo-code for implementing a Forward-Backward method.

FIG. 8 illustrates a Viterbi method using a recursive approach.

FIG. 11 is an example of Viterbi method pseudocode.

FIG. 12 is an example of Forward-Backward method pseudocode for the hybrid model of FIG. 9.

FIGS. 13A-13C is a block diagram of multiple cases of behavior that could be dynamically adjusted by a processor method updating the operations of the tracking device of FIG. 3.

DETAILED DESCRIPTION

Overview of Asset Tracking

Figure 1:
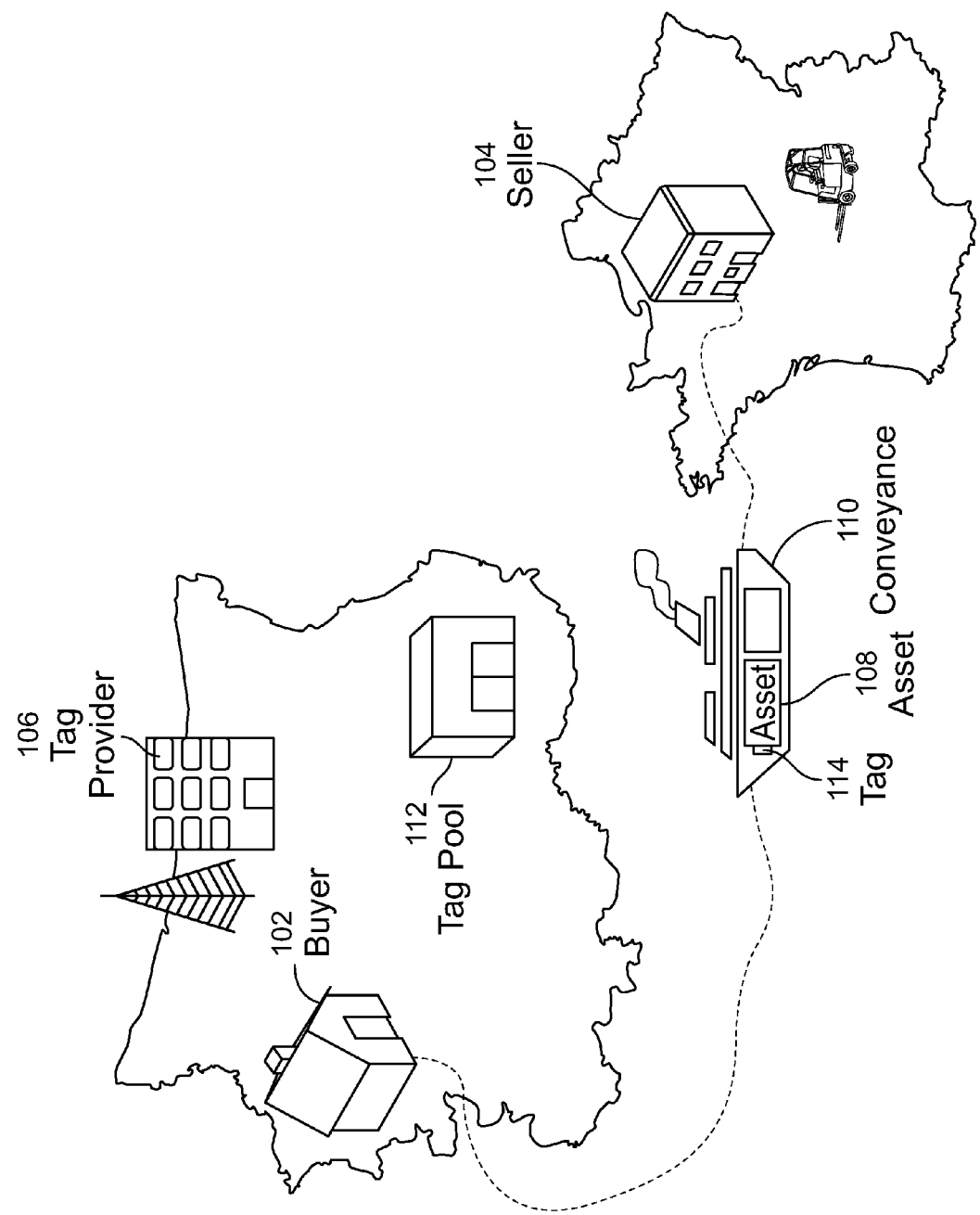
FIG. 1 illustrates an example buyer, seller, and tracking device provider interacting in a shipping scenario.

FIG. 1 illustrates an example buyer 102, seller 104, and tracking device provider 106 interacting in a shipping scenario. An example asset 108 is shipped from the seller 104 to the buyer 102 on an example conveyance 110. In some implementations, the asset is an intermodal shipping container, however the asset can also be, for example, equipment, or other items capable of being monitored or tracked. Examples of conveyances include, but are not limited to, trucks, trains, ships, and airplanes. Examples of assets include, but are not limited to, containers such as dry-van containers, refrigerated containers, ISO tanks, trailers, box trucks, and unit load devices (ULDs).

In general, either the buyer 102 or the seller 104 sends a request to the tracking device provider 106 requesting tracking of the shipment of the asset 108. The tracking device provider 106 arranges for a selected tracking device 114 to be sent from tracking device pool 112 to the location from where the asset is being shipped (e.g., a warehouse of the seller 104). The tracking device pool 112 is a collection of available tracking devices. Each tracking device in the tracking device pool 112 is a tracking device that can be used to track an asset. At the location where the tracking device is shipped (the "origin location") the tracking device 114 can be affixed or coupled to the asset 108, thus securely sealing the asset 108. An example tracking device is the Savi Networks SN-LSE-01, which is a GPS-based Location+Security+Environmental tracking device. The tracking devices do not have to use GPS, but can alternatively or additionally receive location information using various location technologies including, but not limited to: additional Global Satellite Navigation Systems (GNSS), location from cellular towers, or location from other wireless networks such as WiFi networks.

The selected tracking device 114 can be coupled to the asset 108 before the asset begins its journey and/or re-coupled to the asset 108 during the journey (e.g., after authorized custom inspections). During the journey, the tracking device 114 can be programmed to wake up periodically, initiate communication with the tracking device provider 106, and send event notifications to the tracking device provider 106. In general, each event notification can include an identification of the event (or event type), a location of the asset 108 when the event occurred, and additional details of the event such as a date and/or time when the event occurred, the status of the asset 108 before, during, or after the event, or details on the movement of the asset (e.g., accelerometer or velocimeter readings from the tracking device coupled to the asset). The event information can be stored by the tracking device provider 106, for example, in an event database. The tracking device 114 reports various events, including for example, security events, environmental events, process events, and tracking events. Security events can indicate that the asset 108 or tracking device 114 may have been tampered with. For example, the tracking device 114 can report when a vertical or horizontal bolt securing the tracking device to a container is cut (indicating that the asset was opened). Other types of tampers can also be detected (e.g., shock intrusion or light inside the asset that exceeds a threshold). Environmental events can indicate that one or more environmental variables (e.g., temperature, humidity, shock, acceleration) are beyond an acceptable range (e.g., a range specified by the user). Process events indicate that various procedural events in the journey of the asset have occurred. For example, process events can indicate that a tracking device 114 has been attached to the asset 108 or detached from the asset 108 (e.g., that the asset 108 is beginning or ending its tracking device journey). Process events can also indicate other shipment events in the journey of the asset 108 (e.g., procedural events in the journey of the asset 108), including, but not limited to, that the asset 108 has been stuffed (e.g., filled with contents), that the asset 108 has been sealed, that the asset 108 has been flagged for customs inspection, that customs inspection of the asset 108 has begun, that customs inspection of the asset 108 has ended, that the asset 108 is in a shipping yard, that the asset 108 has left a shipping yard, that the asset 108 has sailed, that the asset 108 has been berthed, and that the asset 108 has been unsealed. Tracking events are periodic reports of the location of tracking device 114. For example, the tracking device 114 can send a report of its current location according to a schedule, for example, at fixed intervals of time, regardless of whether any other events have been issued. A tracking system (e.g., system 200 of FIG. 2) can process the tracking events to determine when an asset has entered or left a predefined area. For example, the system 200 can define geofences (e.g., a virtual perimeter) around important locations along the journey of the asset 108 (e.g., ports) and the tracking device 114 or the system 200 can determine that the asset has entered or left a given location when the tracking device 114 enters or leaves a geofence.

In some implementations, the tracking device provider 106 processes the various event notifications received from the tracking device 114 and provides notifications to the buyer 102 and/or the seller 104 and/or other parties. The notifications can be based, in part, on additional information received from the buyer 102 and/or the seller 104, for example, a description of the business of the buyer 102 and/or seller 104, a description of the contents of the asset 108, or a description of a transaction relevant to the contents of the asset 108.

In some implementations, the tracking device also processes commands (e.g., Over-the-Air (OTA) commands) received from the tracking device provider 106 during a communication session between the tracking device and servers operated by the tracking device provider 106.

Example Tracking Device System

Figure 2:
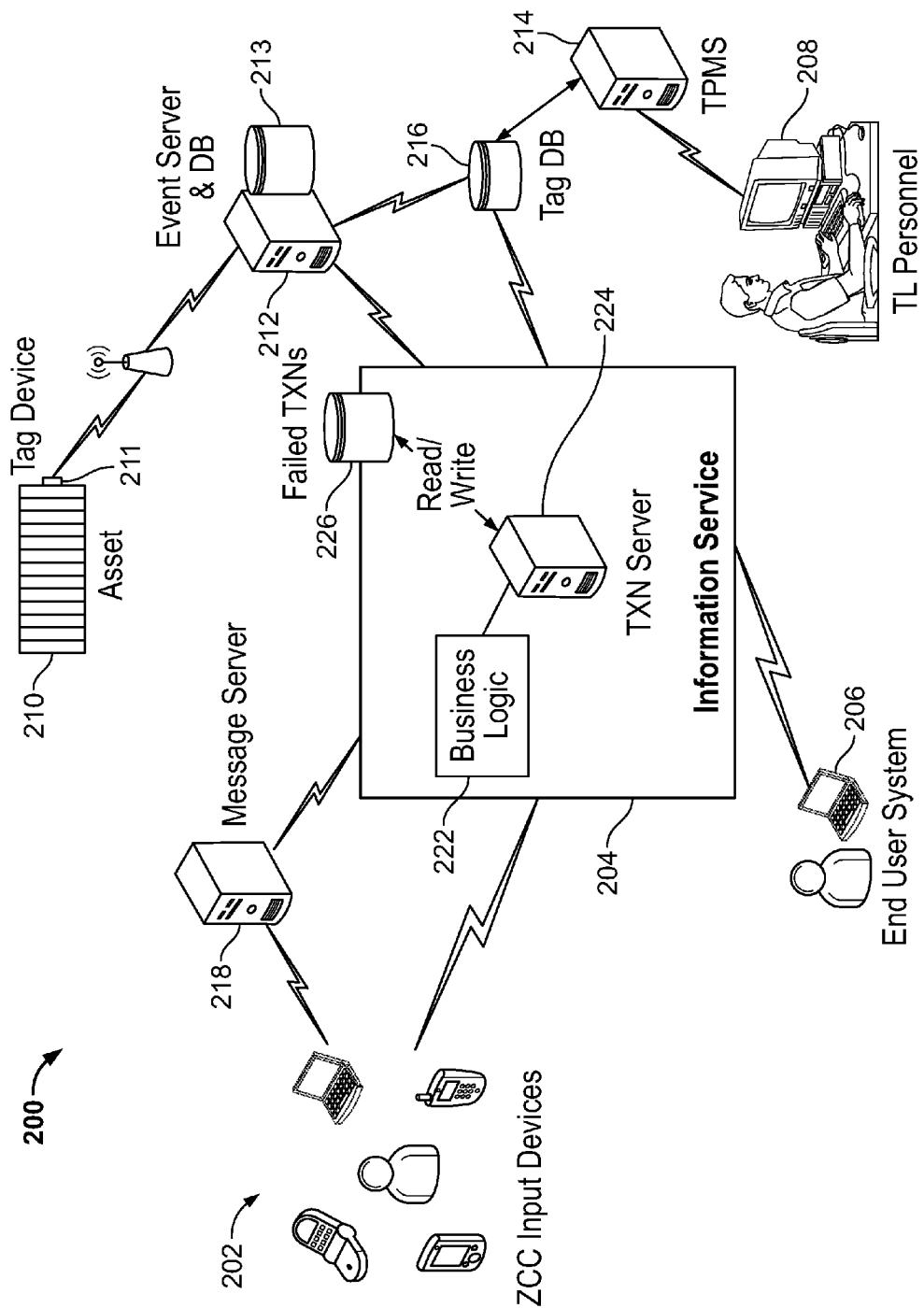
FIG. 2 is a block diagram of an example tracking device system that associates a tracking device with an asset and monitors and tracks the asset using data received from the tracking device in accordance with at least one implementation.

FIG. 2 is a block diagram of an example tracking device system 200 that associates a tracking device with an asset and monitors and tracks the asset using data received from the tracking device. The system 200 commissions (associates) tracking devices to assets, decommissions (disassociates) tracking devices from assets, provides notifications of events (e.g., security, environmental, process, and tracking events), and can reset tracking device status remotely.

In some implementations, the system 200 can include one or more Zero Client Commissioning (ZCC) input devices 202, an information service 204, one or more end user systems 206, Tracking device Logistics Personnel (TL Personnel) 208, one or more assets 210, one or more tracking devices 211 affixed or coupled to the one or more assets 210, an event server 212, an event database 213, a Tracking device Pool Management System (TPMS) 214, a tracking device database 216, a message server 218, a transaction (TXN) server 224, and a failed transaction database 226.

The ZCC input devices 202 are used to commission and decommission tracking devices to assets. The ZCC input devices 202 can be any suitable communication device, including, but not limited to, mobile phones, land phones, email devices, and portable computers. The ZCC input devices 202 communicate with the information service 204 through the message server 218 using a variety of communication modes, including but not limited to: Integrated Voice Response (IVR), Short Message Service (SMS), email, handheld application, Web interface, and Electronic Data Interchange (EDI) or any other form of electronic message sharing. The ZCC input devices 202 can be operated by various actors having various roles in the supply chain, including but not limited to: dock workers, longshoreman, logistics service providers, freight forwarders, field agents, customs agents, and any other personnel involved in the tracking of an asset.

The information service 204 allows end user systems 206 to track the status of assets 210 in real-time, integrates enterprise data for end user systems, and performs supply chain analysis, including generating supply chain management statistics. The transaction server 224 runs a tracking application that receives event location/status transaction messages (e.g., event notifications) or reports from the event server 212 and applies business logic 222 to the transactions for validating and maintaining associations between tracking device identifiers and asset identifiers. Successful transactions are posted against assets and tracking devices. Failed transactions and reason codes are written to an exception queue in the failed transaction database 226.

The information service 204 can use a portal (not shown) to provide Web forms to end user systems 206 (e.g., a browser on a PC or mobile device). The Web forms can provide an input mechanism for a user to commission or decommission tracking devices and can provide an output mechanism for users to receive real-time tracking and status information regarding assets and events.

The tracking device 211 wakes up periodically to initiate communication with the event server 212 and to send event notifications to the event server 212. In general, each event notification includes an identification of the event (or event type), a location of the asset when the event occurred, and optionally additional details of the event such as the status of the asset before, during, or after the event. The event notification can also include an identification of the tracking device, or an identification of the asset to which the tracking device is coupled. The event information can be stored in the event database 213. The tracking device 211 reports various events, including for example, security events, environmental events, process events, tracking events, and location events, as described above with reference to FIG. 1.

The event server 212 periodically receives event notifications from the tracking device 211. The event server can process location information in the notifications. The event server 212 also constructs and sends commands (e.g., OTA commands) to the tracking device 211. Some notification management functions performed by the event server 212 include but are not limited to: checking incoming notifications for syntax errors and population of mandatory fields, checking the accuracy of location information in incoming notifications, sorting or sequencing notifications logically before forwarding the notifications to the information service 204, and constructing output transactions that comply with processing logic.

In some implementations, the TPMS 214 maintains an inventory of tracking devices in the tracking device database 216. The TPMS 214 also maintains the association of the asset identifier (ID) and tracking device ID and the logical state or status of each tracking device, such as 'In Use,' 'Available,' 'Begin Journey', 'End Journey', etc. The TPMS 214 also maintains the allocation and availability of tracking devices for logistics and pre-positioning purposes, and may track the health of tracking devices stored in inventory.

In some implementations, the TPMS 214 allows TL personnel 208 to perform housekeeping functions, such as tracking device forecasts, ordering new tracking devices, detecting lost tracking devices, billing management, salvage and environmental disposal of failed tracking devices, inventory tracking, customer help desk and financial accounting. The TPMS 214 allows TL personnel 208 to monitor the state of a tracking device 211 'in journey', trouble shoot causes for failure in communicating with the event server 212, and locate lost tracking devices. The TPMS 214 provides analytic tools to monitor tracking device network performance (e.g., GPS/GPRS coverage/roaming area for specific trade lanes).

The tracking device system 200 is one example infrastructure. Other infrastructures are also possible which contain more or fewer subsystems or components than shown in FIG. 2. For example, one or more of the servers or databases shown in FIG. 2 can be combined into a single server or database. As another example, tracking devices can be associated with assets using dedicated handheld devices.

Example Contextually Aware Tracking Device

Figure 3:
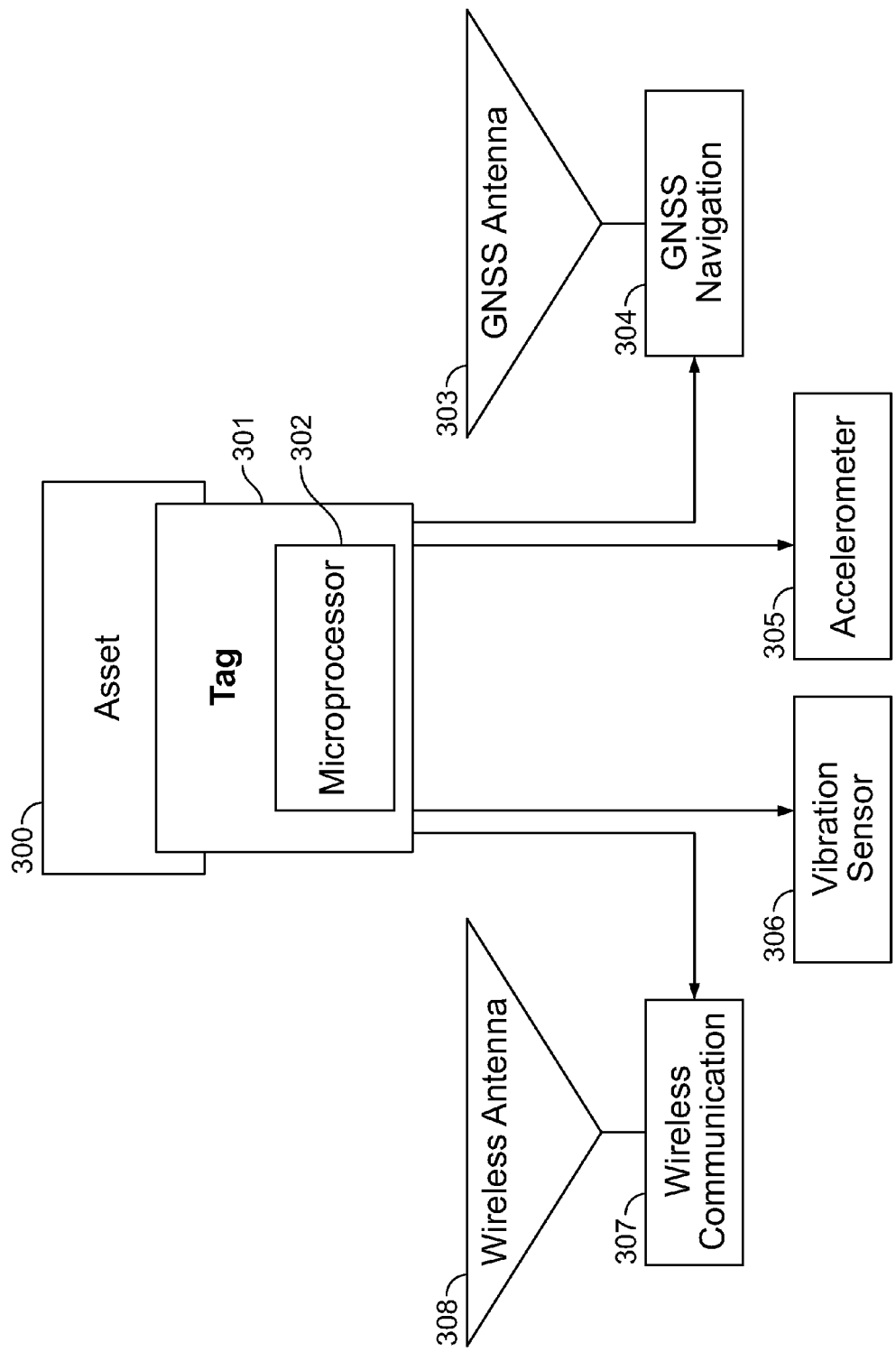
FIG. 3 is a block diagram of a contextually aware tracking device coupled to an asset in accordance with at least one implementation.

FIG. 3 is a block diagram of an example contextually aware tracking device 211. A microprocessor 302 controls the operations of the tracking device 301 that is coupled with the asset 300. The microprocessor can run on different clocks at different times. For example, the microprocessor can run off of a high speed clock when operating, or can run off of a slow speed clock when in sleep mode to conserve power. The microprocessor 302 controls a Global Satellite Navigation System (GNSS) module 304 that is connected to a satellite navigation receive antenna 303. The microprocessor 302 can be awakened by a vibration sensor 306, and can read 3D acceleration measurements from an accelerometer 305. The microprocessor 302 controls a wireless communications module 307 that is connected to a wireless communications transmit/receive antenna 308.

Hidden Markov Model

Introduction to the Hidden Markov Model

Figure 4:
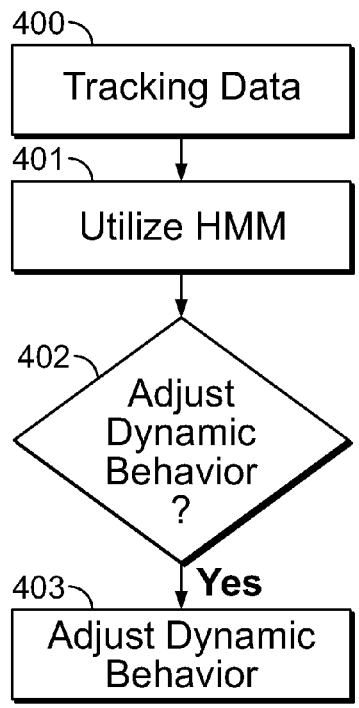
FIG. 4 is a flow diagram of the Hidden Markov Model (HMM) method of determining supply chain context to dynamically adjust the operation of the device of FIG. 3 in accordance with at least one implementation.

FIG. 4 is a flow diagram of top level logic of the HMM. The tracking device of FIG. 3 receives tracking data (400). Once the tracking device receives tracking data, it utilizes the logic of the HMM to determine if the behavior of the tracking device needs to be adjusted (401). If it does determine that the behavior of the tracking device needs to be adjusted (402), then the behavior of the tracking device is dynamically adjusted (403). The tracking device may increase or decrease the rate with which it gathers tracking data 400.

Figure 5:
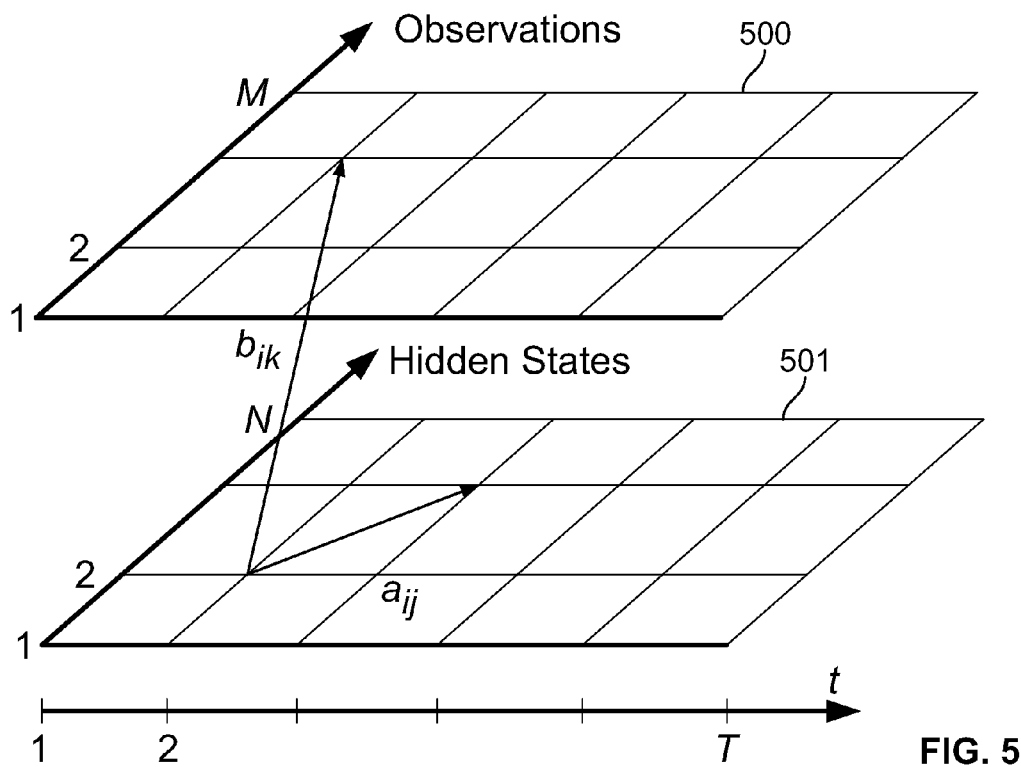
FIG. 5 is a diagram illustrating the technical details of the HMM.

FIG. 5 is a diagram illustrating the technical details of the HMM. In this example case, the HMM is finite which means that the space (X) of hidden states 501 of the hidden Markov chain and the set (O) of the observational outputs 500 are both finite. The transitional probability of going from hidden state $x_i$ to state $x_j$ is labeled here as $a_{ij}$ and the conditional probability of finding an observation, $O_k$, at state $x_i$ is labeled as $b_{ik}$.

Figure 6:
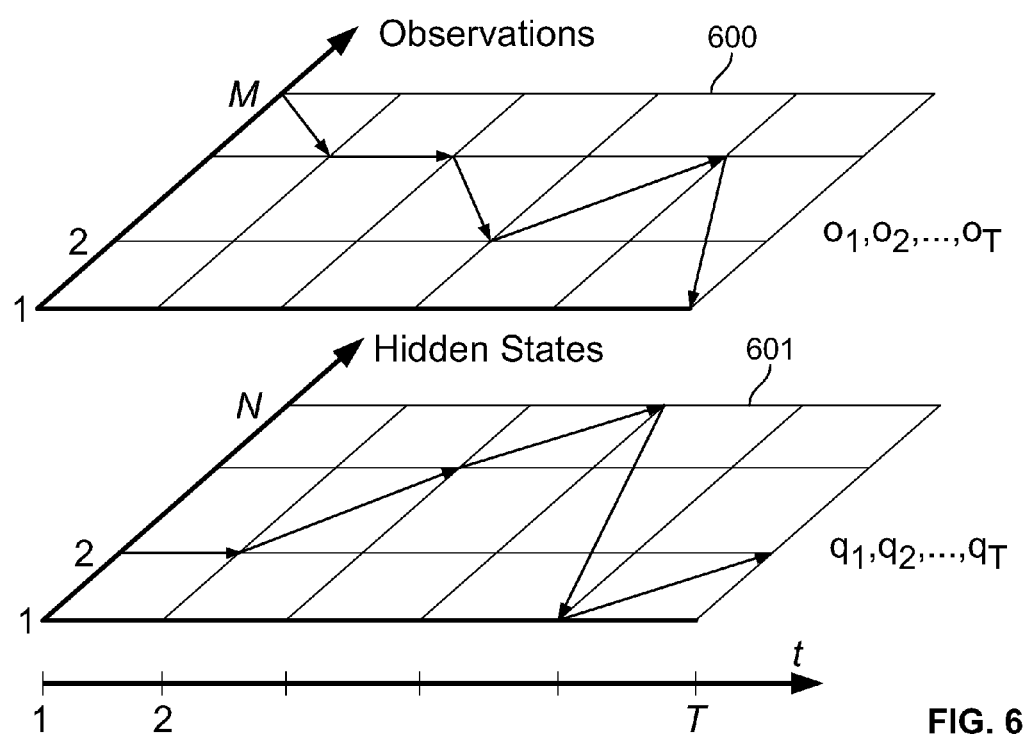
FIG. 6 is a diagram showing the sequence of hidden states and their corresponding observable states.

FIG. 6 is a diagram showing a sequence of hidden states 601 and their corresponding observable states 600. The distinguishing feature of a HMM is that the sequence of hidden states 601 ($x_1, x_2$, and so on) are not directly observable. Thus, they can only be predicted using the trained HMM and the sequence of observable states 600. Below is an outline of the HMM that will support later descriptions.

DEFINITIONS

Observation Sequence: $O=(O_1, O_2, O_3, \ldots, O_N)$

Model: $\lambda$

Most likely state at time t: $q_t$ $\alpha_t(i)$ accounts for the partial observations up to time t $(O_1, O_2, O_3, \ldots, O_t)$ and state $x_i$ at time t.

$\beta_t(i)$ accounts for the remaining observations $(O_{t+1}, O_{t+2}, O_{t+3}, \ldots, O_T)$ given state $x_i$ at time t.

$\gamma_t(i)$ is the probability of being in state $x_i$ at time t, given the Observation sequence O and the model $\lambda$. In other words, $\gamma_t(i) = P(q_t = x_i | O, \lambda)$.

Since $\gamma_t(t)$ is a probability measure, $$\sum_{i=1}^{N} \gamma_i(t) = 1.$$

We can find $$\gamma_i(t) = \frac{\alpha_i(t)\beta_i(t)}{P(O|\lambda)} = \frac{\alpha_i(t)\beta_i(t)}{\sum_{i=1}^{N} \alpha_i(t)\beta_i(t)},$$

where $$q_t = \underset{1 \le i \le N}{\mathrm{argmax}}[\gamma_i(t)] \text{ for } 1 \le t \le T.$$

Train the Model with the EM Algorithm

To train the model, we can use a method called the generalized Expectation Maximization (EM), or Baum-Welch, method. This method examines each journey and counts transitions between states for each tracking device. Then it will normalize the probabilities by multiplying each set by a normalizing constant which will ensure that the probability distribution corresponding to each state adds up to 1.

Smoothing Out the Data with the Forward-Backward Algorithm

The HMM is most efficient when implementing the training using a method called the Forward-Backward method. Example pseudo-code for implementing the Forward-Backward method is illustrated in FIG. 7. In this method, one uses observations to filter, predict and smooth out the present and past states. This not only makes past observations better, but it also makes future observations more accurate.

For the forward method, we define the forward variable, $\alpha_t(i)$, first: $\alpha_t(i) = P(O_1, O_2, O_3, \ldots, O_t, q_t = x_i | \lambda)$, where $\alpha_t(i)$ is the probability of the observation sequence $O_1, O_2, O_3, \ldots, O_t$ and $x_i$ at time t, given the model $\lambda$. This probability can be found using a recursive formula:

Step 1: Initialize $$\alpha_1(i) = \pi_i b_i(o_1)$$

$$1 \le i \le N$$

Step 2: Induction $$a_{t+1}(j) = \left[\sum_{i=1}^{N} \alpha_t(i)\alpha_{ij}\right]b_j(o_{t+1})$$

for all $t = 1, 2, \ldots, T-1; 1 \le j \le N$

Step 3: Termination $$P(O|\lambda) = \sum_{i=1}^{N} \alpha_T(i)$$

For the Backward method, we define the forward variable, $\beta_t(i)$, first: $\beta_t(i) = P(O_{t+1}, O_{t+2}, \ldots, O_T, q_t = x_i | \lambda)$, where $\beta_t(i)$ is the probability of the observation sequence $O_{t+1}, O_{t+2}, \ldots, O_T$ from time t+1 to T and $x_i$ at time t=T, given the model $\lambda$. This probability can be found using a recursive formula:

Step 1: Initialize $$\beta_T(i) = 1$$

$$1 \le i \le N$$

Step 2: Induction $$\beta_t(j) = \sum_{j=1}^{N} a_{ij} b_j(O_{t+1})\beta_{t+1}(j)$$

for all $t = T-1, T-2, \ldots 1$;

$$1 \le i \le N$$

Step 3: Termination $$P(O|\lambda) = \sum_{i=1}^{N} \pi_i b_i(O_1)\beta_1(i)$$

Making Predictions with the Viterbi Method

In order to use the HMM to make predictions, we can use the Viterbi method. The Viterbi method chooses the best state sequence that maximizes the likelihood of the state sequence for the observation sequence. The Viterbi method can be implemented using a recursive approach which is illustrated in FIG. 8. This method can be used to predict the best state sequence and is one way to implement the HMM.

The Viterbi method is illustrated as follows: To initialize the recursion, we first define the state variables 800 which define the base case and will feed the subsequent recursive routine. The recursive functions 801 will terminate when the end of the finite state space is reached and the maximums are found 802. This can be used to derive $q_t(t)$ 803 which is the best score (highest probability) along a single path, at time t, which accounts for the first t observations and ends in state $x_i$. In other words, we can see:

$$q_i(t) = \max_{q_1, q_2, \ldots, q_{t-1}} P[q_1 q_2 \ldots q_t = i, O_1 O_2 \ldots O_t | \lambda].$$

Also, by induction we have, $$q_j(t+1) = \left[\max_i q_i(t) a_{ij}\right] \cdot b_j(O_{t+1}).$$

Implementing the HMM

Figure 9:
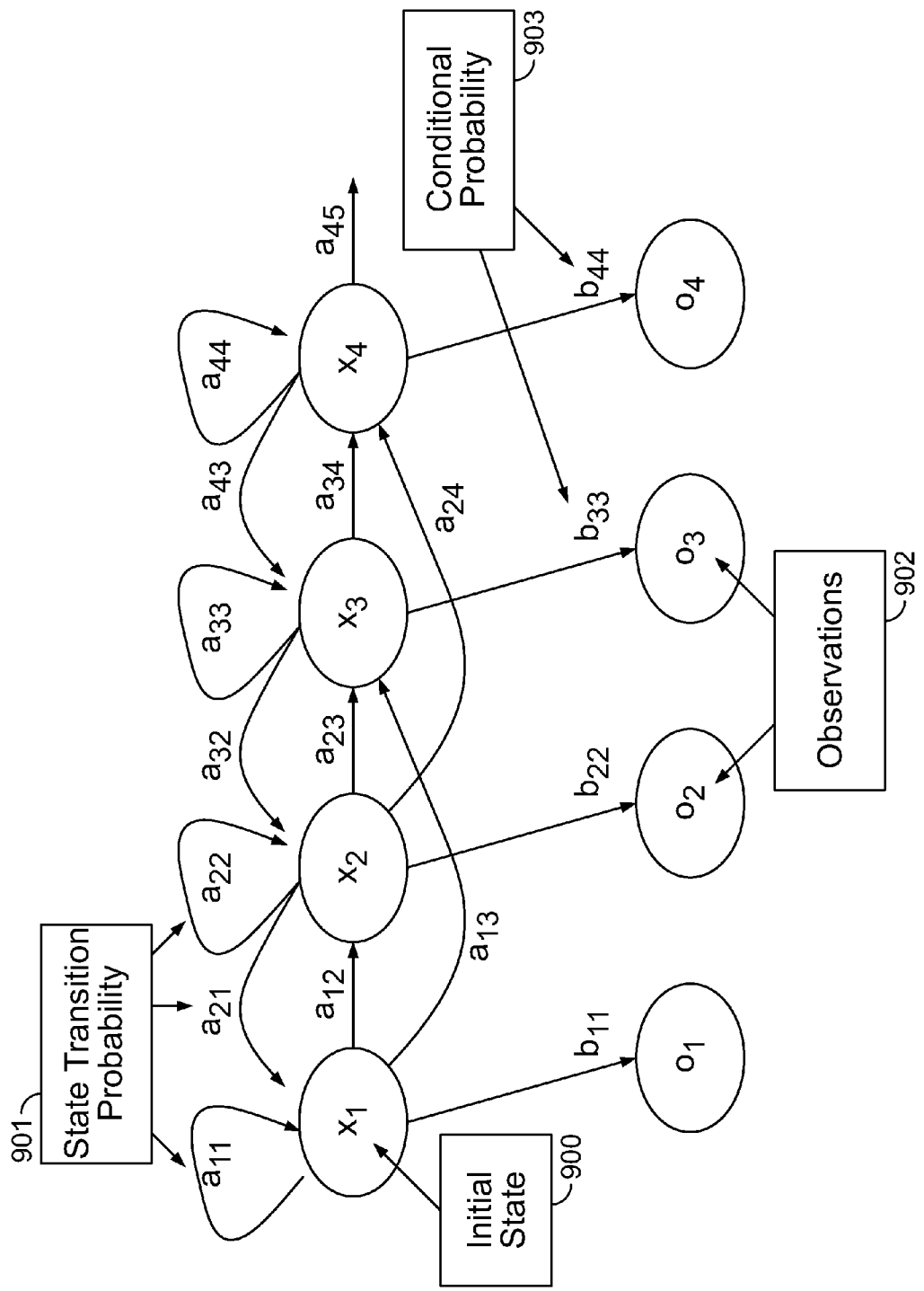
FIG. 9 is a simple illustration of the state and state transitioning of the HMM where the initial state is known in accordance with at least one implementation.

FIG. 9 is a simple illustration of the state and state transitioning of the HMM. In our example HMM implementation, the initial state 900 is known. For each transition from the initial state to a new state, there is an associated transition probability 901. Also, from each state, there is an associated conditional probability 903. The conditional probability 903 is the probability of receiving a particular set of observations 902 given the state. As the HMM is trained, using these probabilities, accurate predictions can be made about the hidden states associated with them. Ultimately, with high probability, they can be used to determine things like the most likely sequence of state transitions.

Figure 10:
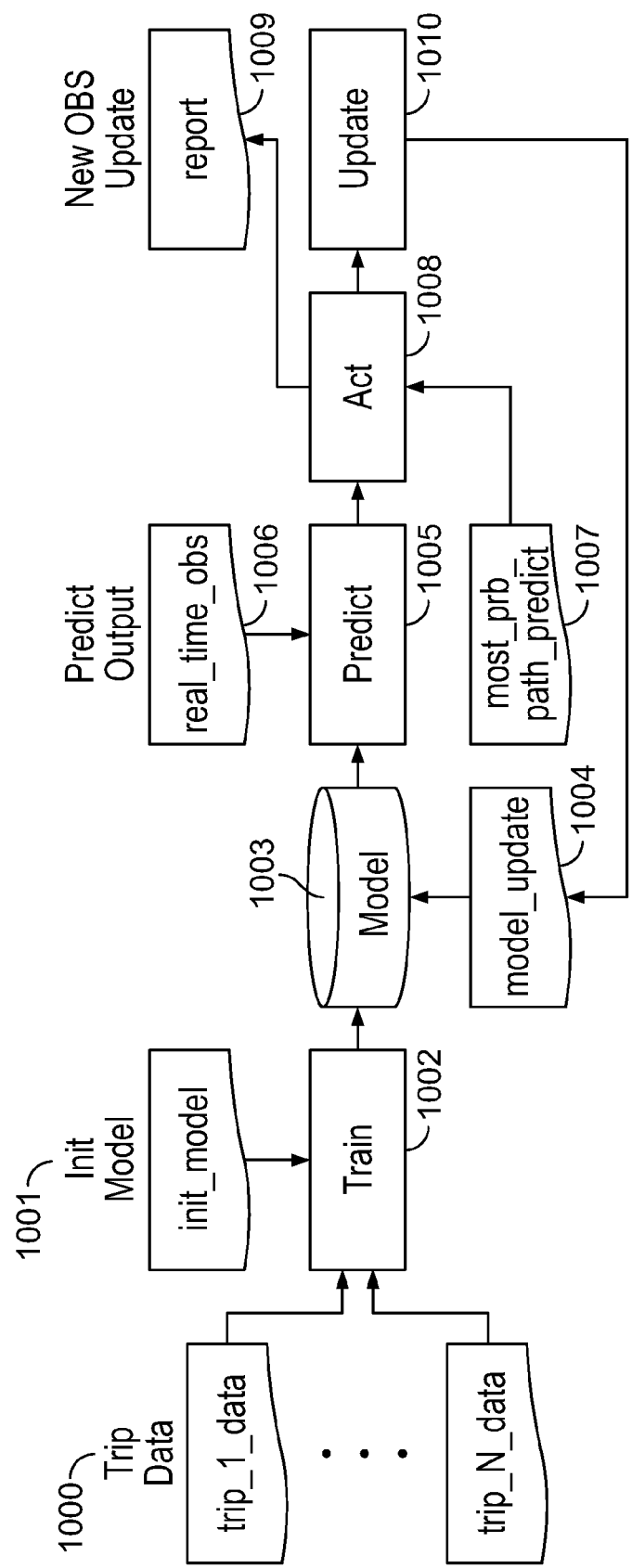
FIG. 10 is a block diagram of a hybrid model structure in accordance with at least one implementation.

FIG. 10 is a block diagram showing the structure of the hybrid model implementation of the HMM. In this implementation of the Hybrid Model, the model 1003 is first trained 1002 on past historical trip data 1000. Once it is trained, the model can be initialized 1001 in the tracking device depicted in FIG. 3. Once the model 1003 is initialized, the tracking device can use the real time observations 1006 as well as the model to predict 1005 the most probable path 1007. Once the most probable path prediction is made, the dynamic behavior of the tracking device can be updated 1008 in accordance with the best prediction 1007. The model 1003 can then be updated 1010 with the newest observation 1009. Since the model 1003 has been updated 1010, then the next prediction from the updated model 1004 will be improved, thereby, allowing the tracking device to be more contextually aware.

FIG. 11 is a more detailed outline of the Viterbi method outlined above. The Viterbi method is recursive because there are recursive relationships between the states in the HMM according to the Markov property. The Viterbi method returns the best prediction 1104 for the next hidden state at time T for an implementation of the HMM. The method is initialized with assumed values for the initial state 1100 and initial probability 1101. Then, it computes the probability of each state transition 1102 from the current state over the entire set of observations given the predictions for which transition will be most likely. This computation occurs until the entire state space is examined and a maximum probability is found 1103. To use this process to find the most probable path prediction, we can keep employing this method for each consecutive state, keeping pointers from each state prediction to its previous state, until we reach the final state.

The forward-backward method is illustrated in more detail in FIG. 12. This method is used to smooth estimates. To initialize this method, it takes in probabilities regarding the first state as well as the initial set of observational values 1200. The forward-backward method uses a vector of forward probabilities up to the current time and returns a set of smoothed estimates up to the current time 1201. The method first filters the data using the set of observational values 1202. Then, the forward probabilities are used along with the backward probabilities to normalize and smooth the data 1203. This can be used but is not limited to training the HMM.

Figure 13B:
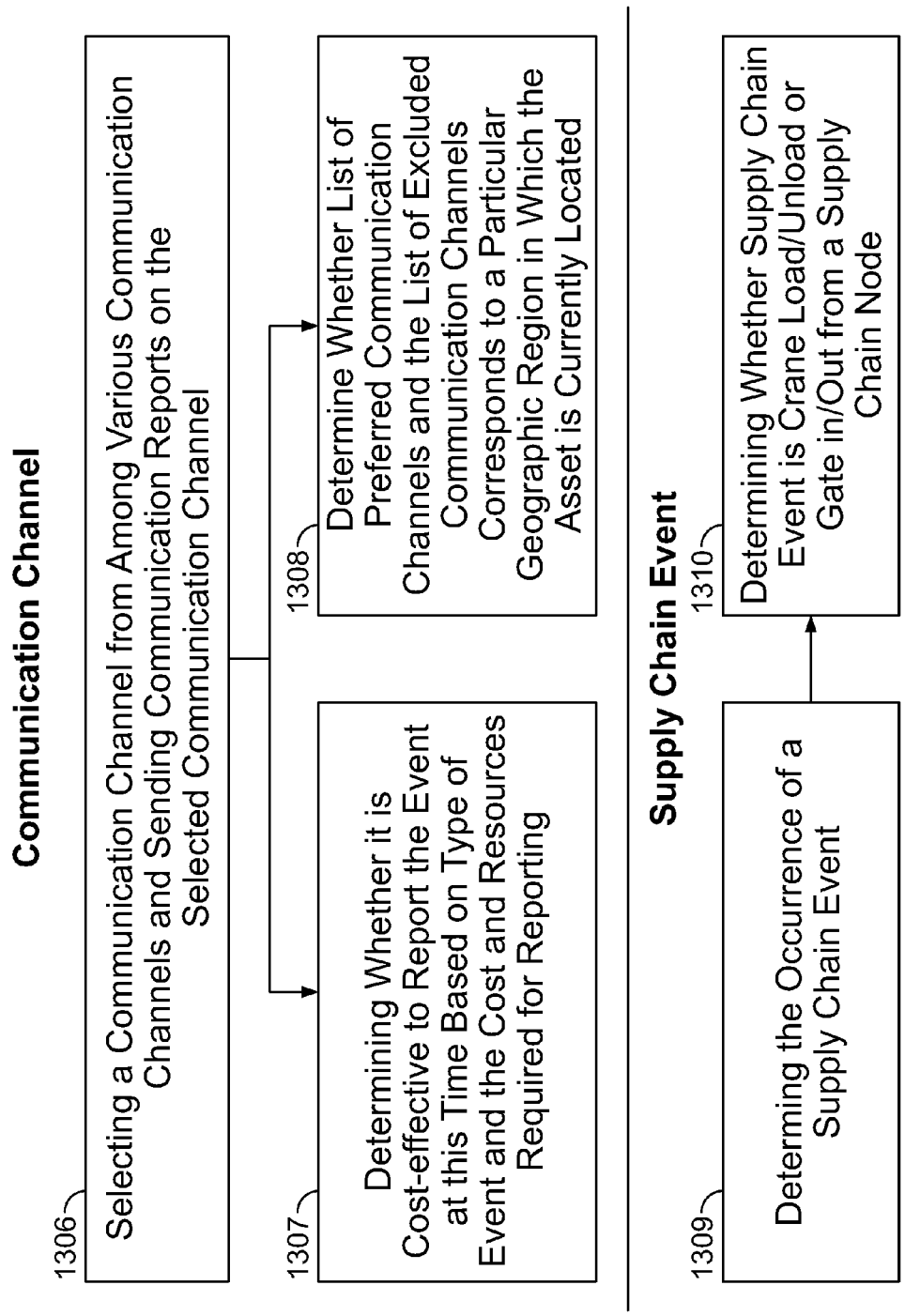

FIGS. 13A-13C illustrate various examples of dynamically updating tracking behavior, based upon the updated predictions of the HMM. This update of dynamic behavior can include increasing the frequency of collecting location data to increase granularity of the location data 1300, or decreasing the frequency of collecting tracking data to reduce power consumption by the tracking device 1301. This update of dynamic behavior can include increasing the frequency of sending communication reports to reduce the latency of the reports 1302, or decreasing the frequency of sending communication reports to reduce power consumption by the tracking device 1303. This update of dynamic behavior can include using higher accuracy modes of a navigation receiver in the tracking device to increase accuracy of the location data 1304, or lower accuracy modes of the navigation receiver to reduce power consumption by the tracking device 1305. This update of dynamic behavior can include selecting a communication channel from a plurality of available communication channels, and sending communication reports on the selected communication channel based on the region or location of the device 1306. This update of dynamic behavior can include determining whether it is cost-effective to report the event at the particular time based at least in part on the type of the event and the cost and resources required for reporting based on the region or location of the device 1307. This update of dynamic behavior can include determining the list of preferred communication channels and the list of excluded communication channels corresponding to the particular geographic region in which the asset is currently located 1308. This update of dynamic behavior can include determining an occurrence of a supply chain event 1309, including a gate in or gate out to or from a supply chain node 1310. This update of dynamic behavior can include determining an occurrence of change of custody of the asset being shipped 1311. This update of dynamic behavior can include determining an updated dynamic estimated time of arrival of the asset at the destination 1312. This update of dynamic behavior can include determining an occurrence of a stuck shipment exception condition 1313.

Other actions to update dynamics behavior of the tracking device based upon the context of the asset shipment are possible, in other embodiments beyond the specific examples shown in FIG. 13.

Figure 14:
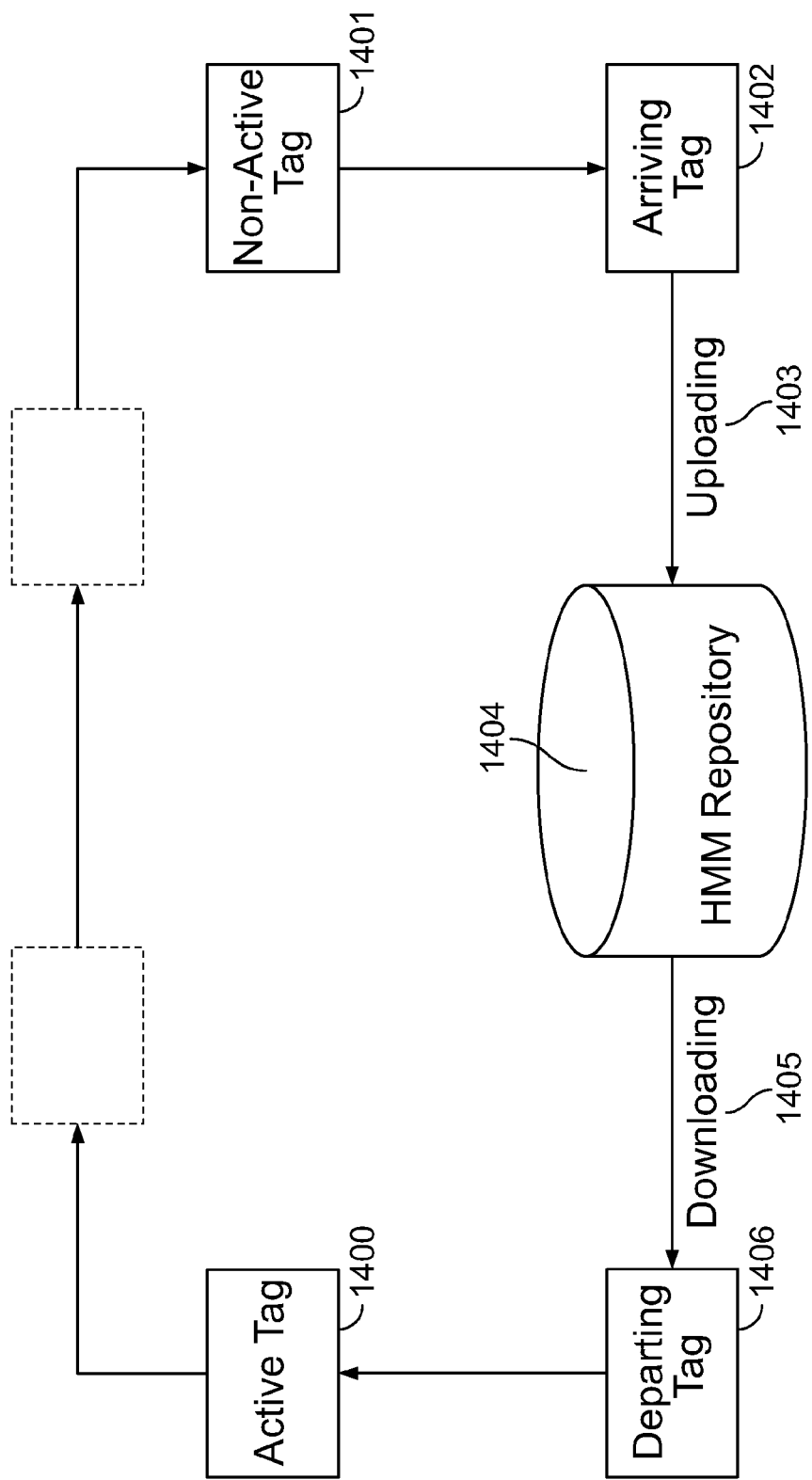
FIG. 14 is a flow diagram of a system of storing and retrieving contextual data for the tracking device from FIG. 3 in accordance with at least one implementation.

Multiple HMM-enabled tracking devices can share data by traversing the same tradelanes. FIG. 14 shows the tracking device being activated 1400 to start retrieving contextual data. After its journey is completed and the tracking device is deactivated 1401, the tracking device will arrive 1402 at a central location where its data will be uploaded 1403 to a central HMM repository 1404. This HMM repository 1404 can be used but is not limited to processing all incoming data from various devices and storing the data. Also, using the HMM repository 1404, data can be downloaded into any new tracking devices that can use the data. In this way, other tracking devices that are departing 1406 will be able to download 1405 and use any data relevant to its journey that was gathered from any previously arriving tracking devices 1402.

Structure of the Hybrid Model

Due to the battery constraints on the tracking device, location data can be collected at discrete intervals rather than in a continuous manner. This restricts the amount of data that the device can accrue to train the HMM. Before the tracking device can confidently use the HMM, the tracking device can gather data across its state space. If the model defines the state space as all locations in range from the tracking device, the state space would be large. This means that to train the device on a tradelane, the device would need to perform many journeys on a tradelane before it is able to use the HMM to make accurate predictions.

An additional limitation due to battery power consumption, is that the tracking device is constrained as to its available processing power. With a large state space, the HMM would require a large amount of memory and processing power from the tracking device in order to make predictions.

To reduce the time that it takes to train the model on a tradelane and to reduce the amount of time and power that it takes to process HMM predictions on the device, the HMM can be implemented as a Hybrid Model. In some implementations, the Hybrid model uses geofence zones as quantized states, to significantly reduce the state space.

Technical Overview of the Hybrid Model

The Hybrid Model may be described as one specific implementation. Other implementations are also possible. The State Space $x \in X$ at any time t for an interval n is the range of possible locations and activities $x_n^t = \{gz_n^t, a_n^t\}$ where $gz \in$ Geofence Zone and $a \in \{stationary, in motion\}$ denotes activity. In this case, the state of being in a geofence zone is not directly observable because of the "noise," or inaccuracies, in the location measurements and the deviations of the asset vehicle from the predicted path. Each observation, O, for a given time t is a measurable collection of data: sensor data and tracking data.

The formula for the transition probability of this model is give here (Equation 1):

$$P(X^t = x_j | X^{t-1} = x_i) = P(a_j, gz_j | a_i, gz_i) = P(a_j | a_i, gz_i) \cdot P(gz_j | gz_i, a_i) \tag{1}$$

Transition of Zone: $P(gz_j|gz_i,a_i)$ is the probability of transition to a new geofence zone at time t given the previous geofence zone and previous activity.

Transition of Activity: $P(a_j|a_i,gz_i)$ models the probability of whether or not the tracking device is moving at time t. The model is initialized with the information that, in most cases, moving tracking devices continue to move and non-moving ones continue not to move.

Nested Geofence Models

The Hidden Markov Method and Hybrid Model provide context for tradelanes in which historical data is gathered to train the model. This historical data will not be available when first commencing shipments through a new tradelane. This historical data will also not be available, for shipments that stray off a planned tradelane due to supply chain exception events into new tradelanes without historical data. A Nested Geofences model can provide a capability for recognizing context without the need to train on previous historical data.

Figure 15:
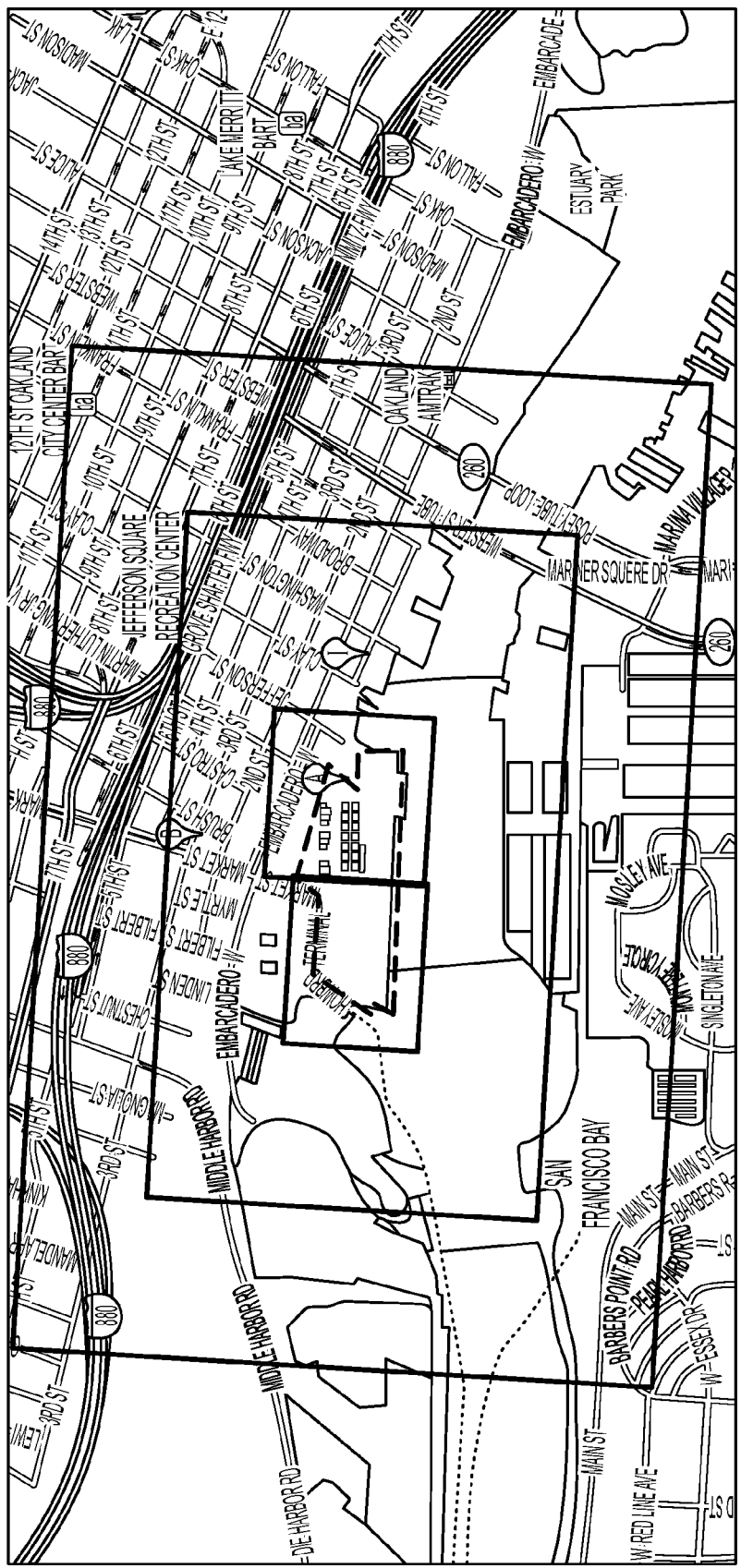
FIG. 15 illustrates nested geofencing around a shipping port.

FIG. 15 illustrates a notional example of nested geofences around the Port of Oakland terminal. The distance between the geofences is drawn close together to aid in visibility, whereas in practice the geofences might be much farther apart. Note that an irregularly shaped terminal can be represented by multiple touching rectangular geofences. As a tracking device on an asset enters successive internal geofences, the context of the shipment can be recognized to be approaching closer and closer to the center node of the geofence. Conversely, exiting successive geofences can be used to recognized departure away from the center node of the geofence.

Figure 16:
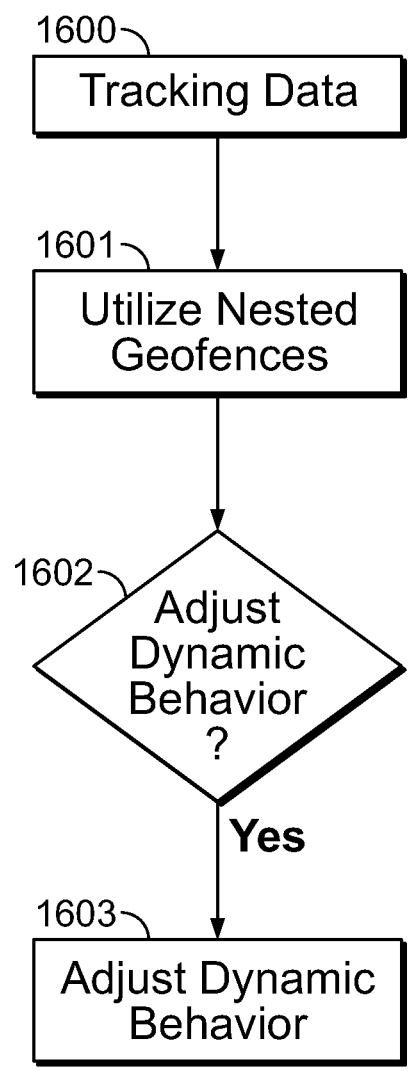
FIG. 16 is a flow diagram of the Nested Geofence method of determining supply chain context to dynamically adjust the operation of the device of FIG. 3 in accordance with at least one implementation.

FIG. 16 illustrates top level logic of the Nested Geofences method. Tracking data 1600 is used by a nested geofences model 1601. If the nested geofences model 1601 determines that the dynamic behavior of the tracking device should be adjusted 1602, then the adjustment is made to the dynamic behavior of the tracking device 1603.

Figure 17:
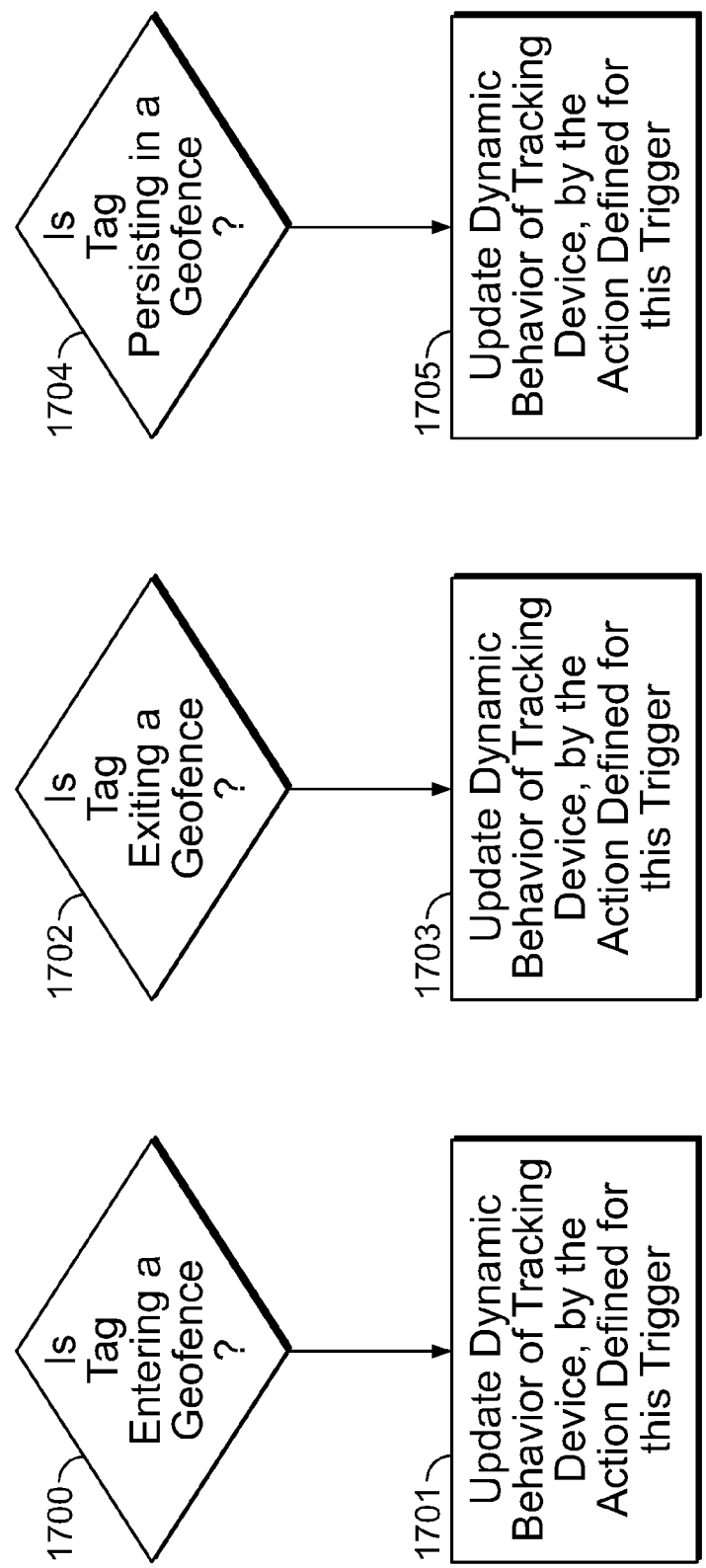
FIG. 17 are multiple flow diagrams of the implementation of the Nested Geofence method of FIG. 16 to learn new context.

FIG. 17 illustrates a next level of detail of the logic of the Nested Geofences method. A shipment can be determined to enter a geofence 1700, exit a geofence 1702 or persist within a geofence past a time threshold 1704. Entering a geofence 1700 is based upon being outside of a geofence for one location update, then inside the geofence for the next location update. Similarly, exiting a geofence 1702 is based upon being inside of a geofence for one location update, then outside the geofence for the next location update. Persisting within a geofence 1704 is based upon no change to a geofence status past a time threshold. Due to variance in accuracy of locating a tracking device on a shipment, there can be false alarms of entering a geofence, or missed detects of entering a geofence. These false geofence statuses can be suppressed by integrating over time, to require N consecutive locations inside or outside of a geofence to declare a state change.

Based upon the geofence status, the tracking device dynamic behavior may be updated based upon entering a geofence 1701, exiting a geofence 1703 or persisting within a geofence 1705.

Various actions can be defined to be taken to update the behavior of a tracking device, based upon the trigger of entering a geofence 1700. This update of dynamic behavior 1701 can include increasing the frequency of collecting location data to increase granularity of the location data. This update of dynamic behavior 1701 can include increasing a frequency of sending communication reports to reduce a latency of the reports. This update of dynamic behavior 1701 can include using higher accuracy modes of a navigation receiver in the tracking device to increase accuracy of the location data. This update of dynamic behavior 1701 can include selecting a communication channel from a plurality of available communication channels based upon the region or location of the device. This update of dynamic behavior 1701 can include determining whether it is cost-effective to report an event at the particular time based at least in part on a type of the event and the cost and resources required for reporting for the region or location of the device. This update of dynamic behavior 1701 can include utilizing preferred communication channels or excluding communication channels corresponding to a particular geographic region in which the asset is currently located. This update of dynamic behavior 1701 can include determining an occurrence of a supply chain event, including a gate in to a supply chain node. This update of dynamic behavior 1701 can include determining an occurrence of change of custody of the asset being shipped. This update of dynamic behavior 1701 can include determining an updated dynamic estimated time of arrival of the asset at the destination.

Various actions can be defined to be taken to update the behavior of a tracking device, based upon the trigger of exiting a geofence 1702. This update of dynamic behavior 1703 can include reducing the frequency of collecting location data to reduce power consumption by the tracking device. This update of dynamic behavior 1703 can include reducing a frequency of sending communication reports to reduce power consumption by the tracking device. This update of dynamic behavior 1703 can include using lower accuracy modes of the navigation receiver to reduce power consumption by the tracking device. This update of dynamic behavior 1703 can include selecting a communication channel from a plurality of available communication channels based upon the region or location of the device. This update of dynamic behavior 1703 can include determining whether it is cost-effective to report an event at the particular time based at least in part on a type of the event and the cost and resources required for reporting for the region or location of the device. This update of dynamic behavior 1703 can include utilizing preferred communication channels or excluded communication channels corresponding to a particular geographic region in which the asset is currently located. This update of dynamic behavior 1703 can include determining an occurrence of a supply chain event, including a gate out from a supply chain node. This update of dynamic behavior 1703 can include determining an occurrence of change of custody of the asset being shipped. This update of dynamic behavior 1703 can include determining an updated dynamic estimated time of arrival of the asset at the destination.

Various actions can be defined to be taken to update the behavior of a tracking device, based upon the trigger of persisting within a geofence 1704. This update of dynamic behavior 1705 can include reducing the frequency of collecting location data to reduce power consumption by the tracking device. This update of dynamic behavior 1705 can include reducing a frequency of sending communication reports to reduce power consumption by the tracking device. This update of dynamic behavior 1705 can include using lower accuracy modes of the navigation receiver to reduce power consumption by the tracking device. This update of dynamic behavior 1705 can include determining whether it is cost-effective to report an event at the particular time based at least in part on a type of the event and the cost and resources required for reporting for the region or location of the device. This update of dynamic behavior 1705 can include determining an updated dynamic estimated time of arrival of the asset at the destination. This update of dynamic behavior 1705 can include determining an occurrence of a stuck shipment exception condition.

These updates of dynamic behavior 1705 can be based on accumulating data from multiple tracking devices, and downloading contextual data to each tracking device.

Other actions to update dynamics behavior of the tracking device based upon the context of the asset shipment are possible, in other embodiments beyond the specific examples.

Sensor Model

Figure 18:
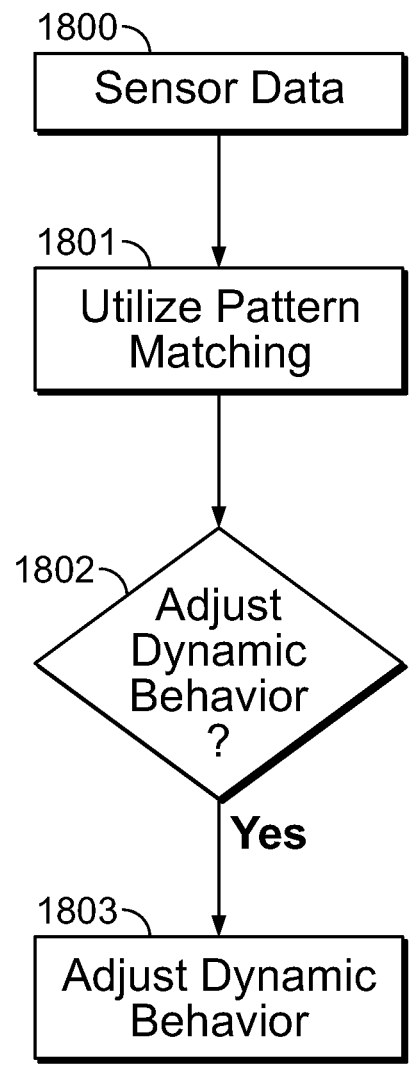
FIG. 18 is a flow diagram of the Sensor Pattern Matching method of determining supply chain context to dynamically adjust the operation of the device of FIG. 3 in accordance with at least one implementation.

The Hidden Markov Method, Hybrid Model and Nested Geofence Model provide context for shipments in motion. An additional capability is required to determine context of shipments at rest. FIG. 18 illustrates the top level logic of the Sensor Pattern Matching method. Sensor data 1800 is used by the Sensor Pattern Matching model 1801. The model 1801 will match a group of sensor data 1800 against a library of patterns. If the Sensor Pattern Matching model 1801 finds a match and determines that the dynamic behavior of the tracking device should be adjusted 1802, then the adjustment is made to the dynamic behavior of the tracking device 1803.

Figure 19:
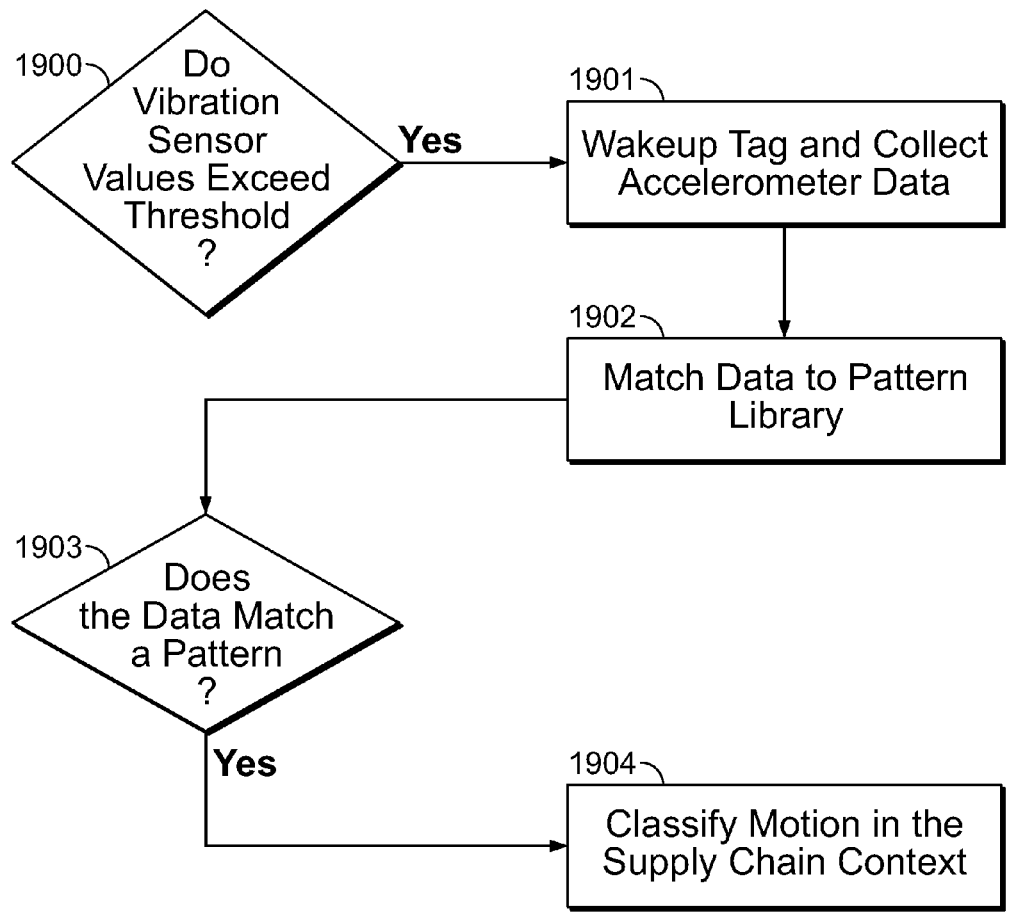
FIG. 19 is a detailed flow diagram of the implementation of the Sensor Pattern Matching method of FIG. 18 to learn new context.

FIG. 19 is a flow diagram showing the decision tree of the Sensor Pattern Matching method illustrated in FIG. 18. Sensor data is used by the model to determine whether the motion sensor values exceed a threshold 1900. Because of the need to conserve the life of the battery for operations, the tracking device is in a low power operational state. The tracking device uses the motion sensor as a trigger to wakeup to perform a specific action. If it is determined that the motion exceeds a threshold, the tracking device is triggered to wakeup and collect motion data 1901 (e.g., accelerometer data). The accelerometer data is then matched to patterns in a stored pattern library 1902. If a pattern match is found 1903, then the tracking device will classify the motion in the supply chain context 1904. This can lead to determining that the behavior of the tracking device needs to be updated.

Various actions can be defined to be taken to update the behavior of a tracking device, based upon matching a Sensor Pattern in a supply chain context. This update of dynamic behavior can include increasing the frequency of collecting location data to increase the granularity of the location data. This update of dynamic behavior can include reducing the frequency of collecting location data to reduce power consumption by the tracking device. This update of dynamic behavior can include increasing the frequency of sending communication reports to reduce the latency of the reports. This update of dynamic behavior can include reducing the frequency of sending communication reports to reduce power consumption by the tracking device. This update of dynamic behavior can include using higher accuracy modes of a navigation receiver in the tracking device to increase accuracy of the location data. This update of dynamic behavior can include using lower accuracy modes of the navigation receiver to reduce power consumption by the tracking device. This update of dynamic behavior can include determining whether it is cost-effective to report an event at the particular time based at least in part on a type of the event and the cost and resources required for reporting for the region or location of the device. This update of dynamic behavior can include determining an occurrence of a supply chain event, including a gate in to or a gate out from a supply chain node, or including a crane load to a ship or a crane load from a ship. This update of dynamic behavior can include determining an occurrence of change of custody of the asset being shipped. This update of dynamic behavior can include determining an updated dynamic estimated time of arrival of the asset at the destination. This update of dynamic behavior can include determining an occurrence of a stuck shipment exception condition.

These updates of dynamic behavior can be based on accumulating data from multiple tracking devices; and downloading contextual data to each tracking device.

Other actions to update dynamics behavior of the tracking device based upon the context of the asset shipment are possible, in other embodiments beyond the specific examples.

Combined Models

Figure 20:
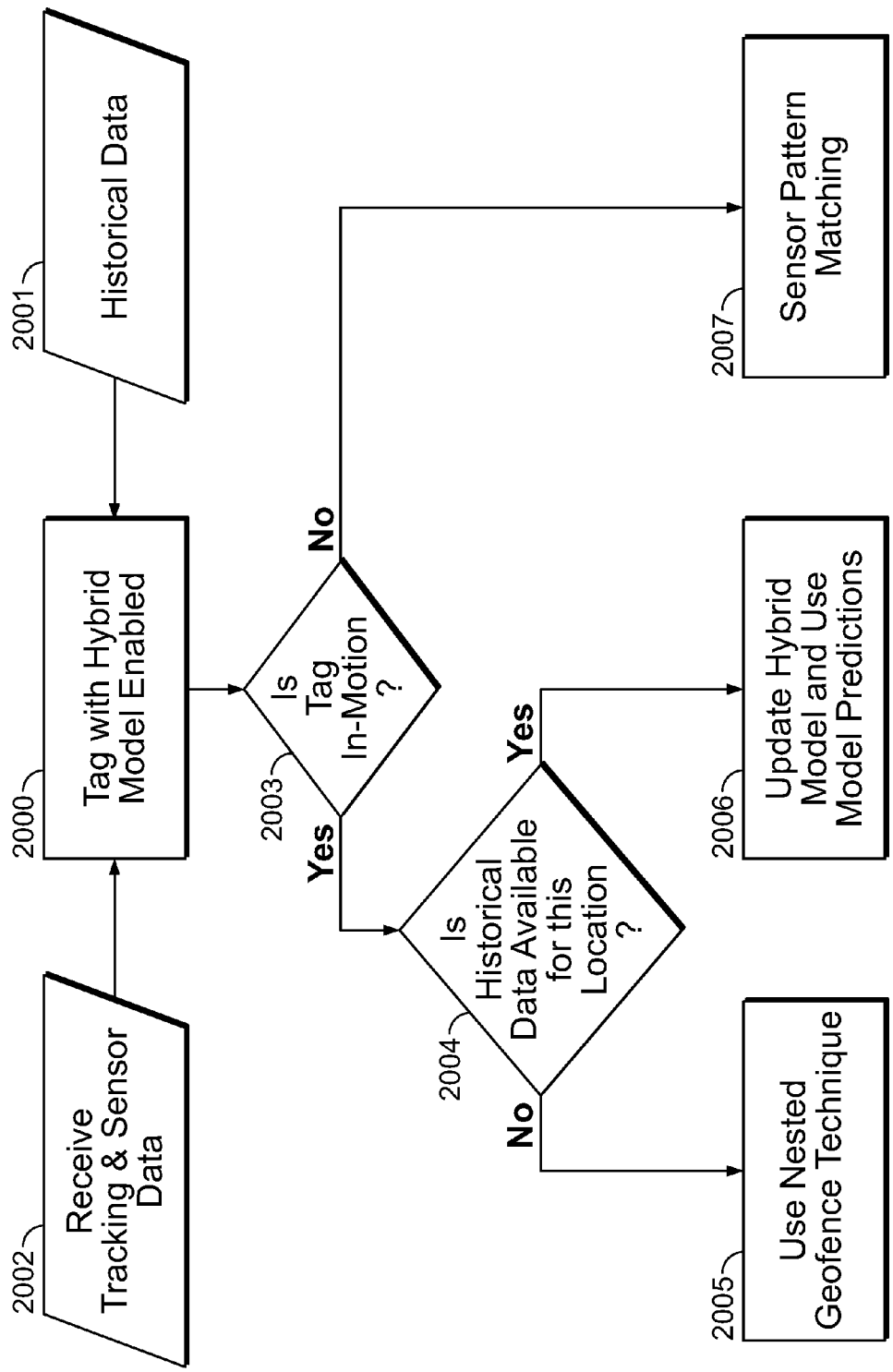
FIG. 20 is a flow diagram showing the combined logic determining when the tracking device is to use the Nested Geofence method of FIG. 16, the HMM method of FIG. 4, or the Sensor Pattern Matching method of FIG. 18.

The logic behind the system that combines the Nested Geofence method, the Hybrid Model method and the Sensor Pattern Matching method is illustrated in the flow diagram of FIG. 20. The tracking device is enabled with the Hybrid model (2000) and acquires historical data 2001 and tracking and sensor data 2002. At a given time in its journey, using this data, it determines whether it is in motion or stationary (2003). If the tracking device is in motion, it looks to see if there exists historical data that it can use for its current location (2004). If it does not hold historical data for its current location (2004), then it relies on the Nested Geofence method (2005), which requires no historical data to use; otherwise, it uses the Hybrid Model (2006), which will use both the historical data and the current tracking and sensor data to make accurate predictions. Finally, if the tracking device is stationary, it will utilize the Sensor Pattern Matching method (2007).

Figure 21:
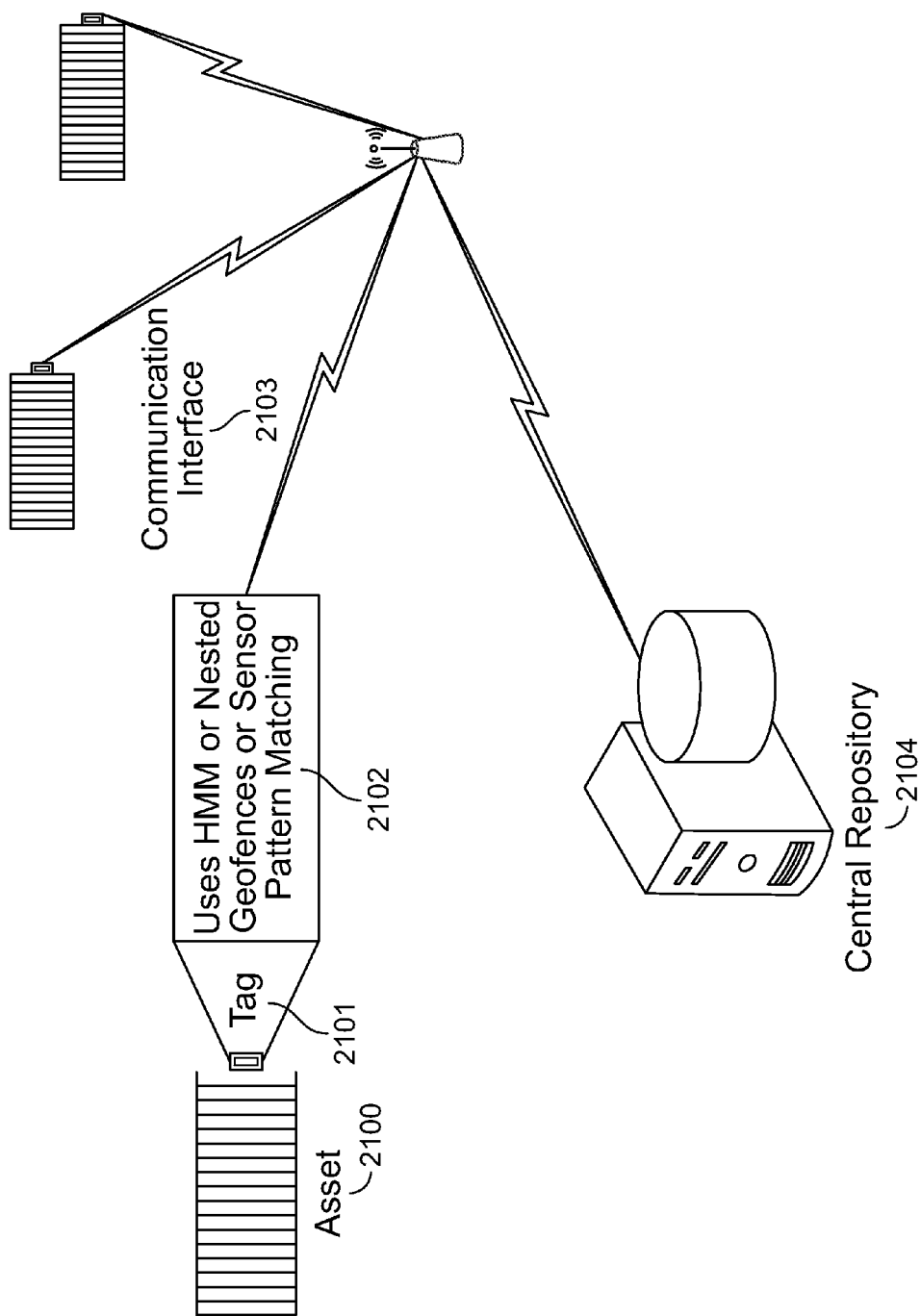
FIG. 21 illustrates the integrated system of using the tracking device coupled to an asset using the combined logic of FIG. 20 and reporting tracking and sensor data or supply chain alerts to a central repository.

FIG. 21 illustrates a system with a processor, which is embedded in a tracking device 2101 and attached to an asset 2100. The tracking device 2101 uses a communication interface 2103 to send and receive data to and from a central repository 2104. The processor used by the tracking device acquires sensor and tracking data and is configured to utilize the HMM, the Nested Geofences or Sensor Pattern Matching models 2102. The processor then uses the conclusions gathered from the models to adjust the dynamic behavior of the tracking device 2101, using the communication interface 2104 to make reports to a central repository 2104.

The combined models provide a comprehensive set of methods to determine when to dynamically update the behavior of a tracking device. This update of dynamic behavior can include increasing the frequency of collecting location data to increase the granularity of the location data. This update of dynamic behavior can include reducing the frequency of collecting location data to reduce power consumption by the tracking device. This update of dynamic behavior can include increasing the frequency of sending communication reports to reduce the latency of the reports. This update of dynamic behavior can include reducing the frequency of sending communication reports to reduce power consumption by the tracking device. This update of dynamic behavior can include using higher accuracy modes of a navigation receiver in the tracking device to increase accuracy of the location data. This update of dynamic behavior can include using lower accuracy modes of the navigation receiver to reduce power consumption by the tracking device. This update of dynamic behavior can include selecting a communication channel from a plurality of available communication channels based upon the region or location of the device. This update of dynamic behavior can include determining whether it is cost-effective to report an event at the particular time based at least in part on a type of the event and the cost and resources required for reporting for the region or location of the device. This update of dynamic behavior can include utilizing preferred communication channels or excluding communication channels corresponding to a particular geographic region in which the asset is currently located. This update of dynamic behavior can include determining an occurrence of a supply chain event, including a gate in to or a gate out from a supply chain node, or including a crane load to a ship or a crane load from a ship. This update of dynamic behavior can include determining an occurrence of change of custody of the asset being shipped. This update of dynamic behavior can include determining an updated dynamic estimated time of arrival of the asset at the destination. This update of dynamic behavior can include determining an occurrence of a stuck shipment exception condition.

These updates of dynamic behavior can be based on accumulating data from multiple tracking devices; and downloading contextual data to each tracking device.

Other actions to update dynamics behavior of the tracking device based upon the context of the asset shipment are possible, in other embodiments beyond the specific examples.

The features described above can be implemented in digital electronic circuitry, or in computer hardware, firmware, software, or in combinations of them. The features can be implemented in a computer program product tangibly embodied in a computer readable medium, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
    receiving tracking data for an asset from a tracking device coupled to the asset, the tracking data including a location of the asset and a timestamp corresponding to the location;
    utilizing a Hidden Markov Model to assess a shipping context of the asset based on the received tracking data, wherein the shipping context is a predicted state of the asset;
    determining that a dynamic behavior of the tracking device is to be adjusted based on the shipping context, wherein the dynamic behavior corresponds to an adjustable frequency of data collection at the tracking device and an adjustable frequency of data reporting at the tracking device; and
    based on the determination, adjusting the dynamic behavior of the tracking device for the asset, wherein adjusting the dynamic behavior includes:
        adjusting the frequency of location data collection from a navigation receiver in the tracking device from a first collection frequency to a second collection frequency, and
        adjusting the frequency of data reporting from the tracking device to a remote server from a first reporting frequency to a second reporting frequency.

2. The method of claim 1, wherein adjusting the dynamic behavior of the tracking device, comprises: adjusting a frequency of collecting location data to increase granularity of the location data, or to reduce power consumption by the tracking device.

3. The method of claim 1, wherein adjusting the dynamic behavior of the tracking device comprises: adjusting a frequency of sending communication reports to reduce a latency of the reports, or to reduce power consumption by the tracking device.

4. The method of claim 1, wherein adjusting the dynamic behavior of the tracking device comprises: using higher accuracy modes of a navigation receiver in the tracking device to increase accuracy of the location data, or lower accuracy modes of the navigation receiver to reduce power consumption by the tracking device.

5. The method of claim 1, wherein adjusting the dynamic behavior of the tracking device comprises: selecting a communication channel from a plurality of available communication channels; and sending communication reports on the selected communication channel.

6. The method of claim 5, wherein it is determined whether it is cost-effective to report the event at the particular time is based at least in part on a type of the event and the cost and resources required for reporting.

7. The method of claim 5, wherein the list of preferred communication channels and the list of excluded communication channels correspond to a particular geographic region in which the asset is currently located.

8. The method of claim 1, wherein determining the shipping context comprises: determining an occurrence of a supply chain event.

9. The method of claim 8, wherein the supply chain event is at least one of a gate in to a supply chain node or gate out from a supply chain node.

10. The method of claim 1, wherein determining the shipping context comprises: determining an occurrence of change of custody of the asset being shipped.

11. The method of claim 1, wherein determining the shipping context comprises: determining an updated dynamic estimated time of arrival of the asset at a destination.

12. The method of claim 1, wherein determining the shipping context comprises: determining an occurrence of a stuck shipment exception condition.

13. The method of claim 1, further comprising: accumulating data from multiple tracking devices; and downloading contextual data to each tracking device.

14. A computer-implemented method, comprising:
receiving tracking data for an asset from a tracking device coupled to the asset, the tracking data including a location of the asset and a timestamp corresponding to the location;
utilizing nested geofences to assess a shipping context of the asset based on the received tracking data, wherein the shipping context is that the asset has entered or exited at least one of the nested geofences;
determining that a dynamic behavior of the tracking device is to be adjusted based on the shipping context, wherein the dynamic behavior corresponds to an adjustable frequency of data collection at the tracking device and an adjustable frequency of data reporting at the tracking device; and
based on the determination, adjusting the dynamic behavior of the tracking device for the asset, wherein adjusting the dynamic behavior includes:
adjusting the frequency of location data collection from a navigation receiver in the tracking device from a first collection frequency to a second collection frequency, and
adjusting the frequency of data reporting from the tracking device to a remote server from a first reporting frequency to a second reporting frequency.

15. A computer-implemented method, comprising:
receiving sensor data for an asset from a tracking device coupled to the asset, the sensor data including one or more of vibration data, velocimeter data, and accelerometer data of the asset and a timestamp corresponding to the sensor data;
utilizing pattern matching to assess a shipping context of the asset based on the received sensor data, wherein the shipping context is a predicted state of the asset;
determining that a dynamic behavior of a tracking device coupled to the asset is to be adjusted based on the shipping context, wherein the dynamic behavior corresponds to an adjustable frequency of data collection at the tracking device and adjustable frequency of data reporting at the tracking device; and
based on the determination, adjusting the dynamic behavior of the tracking device for the asset, wherein adjusting the dynamic behavior includes:
adjusting the frequency of location data collection from a navigation receiver in the tracking device from a first collection frequency to a second collection frequency, and
adjusting the frequency of data reporting from the tracking device to a remote server from a first reporting frequency to a second reporting frequency.

16. The method of claim 15, wherein determining the shipping context comprises: determining an occurrence of a supply chain event.

17. The method of claim 16, wherein the supply chain event is at least one of a crane load to a ship or a crane unload from a ship.

18. A computer-implemented method, comprising:
receiving tracking data for an asset from a tracking device coupled to the asset, the tracking data including a location of the asset and a timestamp corresponding to the location;
receiving sensor data for an asset from the tracking device, the sensor data including one or more of vibration data, velocimeter data, and accelerometer data of the asset at the location;
determining whether the asset is stationary or in motion;
selecting a context model based on whether the asset is stationary or in motion
based on determining that the asset is stationary, selecting a vibration or acceleration pattern matching model;
based on determining that the asset is in motion, selecting at least one of a Hidden Markov model with historical data for a tradelane of the asset, or a nested geofence model without historical data for the tradelane of the asset;
assessing a shipping context of the asset based on the selected model and the received tracking or sensor data;
determining that a dynamic behavior of the tracking device is to be adjusted based on the shipping context, wherein the dynamic behavior corresponds to an adjustable frequency of data collection at the tracking device and an adjustable frequency of data reporting at the tracking device; and
based on the determination that the dynamic behavior is to be adjusted, adjusting the dynamic behavior of the tracking device for the asset, wherein adjusting the dynamic behavior includes:
adjusting the frequency of location data collection from a navigation receiver in the tracking device from a first collection frequency to a second collection frequency, and
adjusting the frequency of data reporting from the tracking device to a remote server from a first reporting frequency to a second reporting frequency.

19. A system for tracking an asset based on shipping context, the system comprising:
a communication interface configured for communicating with a tracking device coupled to the asset, the communication interface configured for receiving tracking data for the asset from the tracking device, the tracking data including a location of the asset and a timestamp corresponding to the location;
a processor coupled to the communication interface and configured for:
utilizing a Hidden Markov Model to assess a shipping context of the asset based on the received tracking data, wherein the shipping context is a predicted state of the asset;
determining that a dynamic behavior of the tracking device is to be adjusted based on the shipping context, wherein the dynamic behavior corresponds to an adjustable frequency of data collection at the tracking device and an adjustable frequency of data reporting at the tracking device; and
based on the determination, adjusting the dynamic behavior of the tracking device for the asset, wherein adjusting the dynamic behavior includes:
adjusting the frequency of location data collection from a navigation receiver in the tracking device from a first collection frequency to a second collection frequency, and
adjusting the frequency of data reporting from the tracking device to a remote server from a first reporting frequency to a second reporting frequency.

20. A system for tracking an asset based on shipping context, the system comprising:
a communication interface configured for receiving tracking data for an asset from a tracking device coupled to the asset, the tracking data including a location of the asset and a timestamp corresponding to the location;
a processor coupled to the communication interface and configured for:
utilizing nested geofences to assess a shipping context of the asset based on the received tracking data, wherein the shipping context is that the asset has entered or exited at least one of the nested geofences;
determining that a dynamic behavior of the tracking device is to be adjusted based on the shipping context, wherein the dynamic behavior corresponds to an adjustable frequency of data collection at the tracking device and an adjustable frequency of data reporting at the tracking device; and
based on the determination, adjusting the dynamic behavior of the tracking device for the asset, wherein adjusting the dynamic behavior includes:
adjusting the frequency of location data collection from navigation receiver in the tracking device from a first collection frequency to a second collection frequency, and
adjusting the frequency of data reporting from the tracking device to a remote server from a first reporting frequency to a second reporting frequency.

21. A system for tracking an asset based on shipping context, the system comprising:
a communication interface configured for receiving sensor data for an asset from one or more sensors from a tracking device coupled to the asset, the sensor data including one or more of vibration data, velocimeter data, and accelerometer data of the asset and a timestamp corresponding to the sensor data;
a processor coupled to the communication interface and configured for:
utilizing pattern matching to assess a shipping context of the asset based on the received sensor data, wherein the shipping context is a predicted state of the asset;
determining that a dynamic behavior of a tracking device coupled to the asset is to be adjusted based on the shipping context, wherein the dynamic behavior corresponds to an adjustable frequency of data collection at the tracking device and an adjustable frequency of data reporting at the tracking device; and
based on the determination, adjusting the dynamic behavior of the tracking device for the asset, wherein adjusting the dynamic behavior includes:
adjusting the frequency of location data collection from a navigation receiver in the tracking device from a first collection frequency to a second collection frequency, and
adjusting the frequency of data reporting from the tracking device to a remote server from a first reporting frequency to a second reporting frequency.

22. A system for tracking an asset based on shipping context, the system comprising:
a communication interface configured for receiving tracking data for an asset from a tracking device coupled to the asset, the tracking data including a location of the asset and a timestamp corresponding to the location, and for receiving sensor data for an asset from the tracking device, the sensor data including one or more of vibration data, velocimeter data, and accelerometer data of the asset at the location;
a processor coupled to the communication interface and configured for:
determining whether the shipment is stationary or in motion based on the sensor data or location data;
selecting a context model based on whether the shipment is stationary or in motion;
based on determining that the shipment is stationary, selecting a vibration or acceleration pattern matching model;
based on determining that the shipment is in motion, selecting at least one of a Hidden Markov model with historical data for a tradelane of the shipment, or a nested geofence model without historical data for the tradelane of the shipment;
assessing a shipping context of the asset based on the selected model and the received tracking or sensor data;
determining that a dynamic behavior of the tracking device is to be adjusted based on the shipping context, wherein the dynamic behavior corresponds to an adjustable frequency of data collection at the tracking device and an adjustable frequency of data reporting at the tracking device; and
based on the determination that the dynamic behavior should be adjusted, adjusting the dynamic behavior of the tracking device for the asset, wherein adjusting the dynamic behavior includes:
adjusting the frequency of location data collection from a navigation receiver in the tracking device from a first collection frequency to a second collection frequency, and adjusting the frequency of data reporting from the tracking device to a remote server from a first reporting frequency to a second reporting frequency.

23. A computer-implemented method, comprising:

receiving tracking data for an asset from a tracking device coupled to the asset, the tracking data including a location of the asset and a timestamp corresponding to the location;

utilizing a Hidden Markov Model to assess a shipping context of the asset based on the received tracking data, wherein the shipping context is a predicted state of the asset;

determining that a dynamic behavior of the tracking device is to be adjusted based on the shipping context, wherein the dynamic behavior corresponds to changing a communication channel of the tracking device and adjusting frequency of data collection and frequency of data reporting at the tracking device; and based on the determination, adjusting the dynamic behavior of the tracking device for the asset, wherein adjusting the dynamic behavior includes:

changing the communication channel of the tracking device from a first communication channel to a second communication channel, and adjusting the frequency of location data collection from a navigation receiver in the tracking device from a first collection frequency to a second collection frequency, and adjusting the frequency of data reporting from the tracking device to a remote server from a first reporting frequency to a second reporting frequency.

24. The method of claim 1, wherein adjusting the dynamic behavior further includes adjusting the frequency of data reporting from the tracking device to a remote server from a first reporting frequency to a second reporting frequency.

* * * * *